United States Patent
Ruijtenbeek et al.

(10) Patent No.: US 12,545,946 B2
(45) Date of Patent: Feb. 10, 2026

(54) METHOD FOR PREDICTING THE RESPONSE OF MELANOMA PATIENTS TO A MEDICAMENT

(71) Applicants: PAMGENE BV, 's-Hertogenbosch (NL); Leiden University Medical Centre, Leiden (NL)

(72) Inventors: Robby Ruijtenbeek, Utrecht (NL); Liesbeth Coosje Hovestad-Bijl, 's-Hertogenbosch (NL); Richard De Wijn, Nijmegen (NL); Sjoerd H. Van Der Burg, Waddinxveen (NL); Elizabeth M. E. Verdegaal, Sassenheim (NL)

(73) Assignees: PAMGENE BV, 's-Hertogenbosch (NL); Leiden University Medical Centre, Leiden (NL)

( * ) Notice: Subject to any disclaimer, the term of this patent is extended or adjusted under 35 U.S.C. 154(b) by 1688 days.

(21) Appl. No.: 16/088,097

(22) PCT Filed: Mar. 31, 2017

(86) PCT No.: PCT/EP2017/057643
§ 371 (c)(1),
(2) Date: Sep. 25, 2018

(87) PCT Pub. No.: WO2017/167942
PCT Pub. Date: Oct. 5, 2017

(65) Prior Publication Data
US 2019/0112633 A1    Apr. 18, 2019

(30) Foreign Application Priority Data

Mar. 31, 2016    (EP) .................................... 16163336

(51) Int. Cl.
*C12Q 1/48*    (2006.01)
(52) U.S. Cl.
CPC ......... *C12Q 1/485* (2013.01); *G01N 2800/52* (2013.01); *G01N 2800/7028* (2013.01)
(58) Field of Classification Search
None
See application file for complete search history.

(56) References Cited

U.S. PATENT DOCUMENTS

2005/0187147 A1    8/2005    Newman et al.
2006/0234909 A1    10/2006    Newman et al.

FOREIGN PATENT DOCUMENTS

EP    2 309 271 A1    4/2011
WO    2012131065 A1    10/2012

OTHER PUBLICATIONS

PCT International Search Report and Written Opinion dated Jun. 16, 2017 for PCT International Patent Application No. PCT/EP2017/057643, 16 pages.
Maat W et al: "Episodic Src activation in uveal melanoma revealed by kinase activity profiling". Briti sh Journal of Cancer, vol. 101. No. 2, Jun. 30, 2009 (Jun. 30, 2009), pp. 312-319, XP055297914.
Maat W et al: "Application Note—Protein Tyrosine Kinases; Target Discovery" Oct. 1, 2010 (Oct. 1, 2010). XP055229565. Retrieved from the Internet: URL:https://www.pamgene.com/upload/image/Applications notes/201009 (Oct. 2010).pdf.
Folkvord S et al: "Prediction of Response to Preoperative Chemoradiotherapy in Rectal Cancer by Multiplex Kinase Activity Profiling". International Journal of Radiation: Oncology Biology Physics, vol. 78. No. 2, Apr. 14, 2010 (Apr. 14, 2010), pp. 555-562. XP028141113.
Ruijtenbeek R: "Kinase activity profiling in tumor tissues by PamChip peptide microarrays". Internet Citation, Dec. 11, 2007 (Dec. 11, 2007), XP002538369, Retrieved from the Internet: URL:http://retina.med.harvard.edu/LITT/Pamgene_12_11_2007.pdf [retrieved-on Jul. 21, 2009].abstract.
Written Opinion of the International Preliminary Examining Authority dated Feb. 26, 2018 for PCT International Patent Application No. PCT/EP2017/057643, 10 pages.
Response dated Apr. 23, 2018 to Second Written Opinion of the International Preliminary Examining Authority dated Feb. 26, 2018 for PCT International Patent Application No. PCT/EP2017/057643, 6 pages.
Response dated Jan. 10, 2018 to Written Opinion dated Jun. 16, 2017 issued by the European Patent Office as International Searching Authority for PCT International Patent Application No. PCT/EP2017/057643, 6 pages.
PCT Notification of Transmittal of the International Preliminary Report on Patentability dated May 17, 2018 or PCT International Patent Application No. PCT/EP2017/057643, 23 pages.

*Primary Examiner* — Sudhakar Katakam
*Assistant Examiner* — Tara L Martinez
(74) *Attorney, Agent, or Firm* — Amster, Rothstein & Ebenstein LLP

(57) ABSTRACT

The present invention relates to a method for determining or predicting the response of a patient diagnosed with melanoma to targeted pharmacotherapy. The present invention also aims to provide methods and devices for predicting the response of patients diagnosed with melanoma to specific medicaments. More specifically, the present invention provides methods which measure kinase and/or phosphatase activity by studying phosphorylation levels and profiles and inhibitions thereof by drugs in samples, preferably blood samples, of said patients.

9 Claims, 8 Drawing Sheets
Specification includes a Sequence Listing.

SEQUENCE LISTING

```
<160> NUMBER OF SEQ ID NOS: 189

<210> SEQ ID NO 1
<211> LENGTH: 13
<212> TYPE: PRT
<213> ORGANISM: Artificial Sequence
<220> FEATURE:
<223> OTHER INFORMATION: CDK7_157_169

<400> SEQUENCE: 1

Gly Leu Ala Lys Ser Phe Gly Ser Pro Asn Arg Ala Tyr
1               5                   10

<210> SEQ ID NO 2
<211> LENGTH: 13
<212> TYPE: PRT
<213> ORGANISM: Artificial Sequence
<220> FEATURE:
<223> OTHER INFORMATION: TYRO3_679_691

<400> SEQUENCE: 2

Lys Ile Tyr Ser Gly Asp Tyr Tyr Arg Gln Gly Cys Ala
1               5                   10

<210> SEQ ID NO 3
<211> LENGTH: 13
<212> TYPE: PRT
<213> ORGANISM: Artificial Sequence
<220> FEATURE:
<223> OTHER INFORMATION: PRGR_786_798

<400> SEQUENCE: 3

Glu Gln Arg Met Lys Glu Ser Ser Phe Tyr Ser Leu Cys
1               5                   10

<210> SEQ ID NO 4
<211> LENGTH: 13
```

```
<212> TYPE: PRT
<213> ORGANISM: Artificial Sequence
<220> FEATURE:
<223> OTHER INFORMATION: PDPK1_369_381

<400> SEQUENCE: 4

Asp Glu Asp Cys Tyr Gly Asn Tyr Asp Asn Leu Leu Ser
1               5                   10

<210> SEQ ID NO 5
<211> LENGTH: 13
<212> TYPE: PRT
<213> ORGANISM: Artificial Sequence
<220> FEATURE:
<223> OTHER INFORMATION: VGFR1_1326_1338

<400> SEQUENCE: 5

Asp Tyr Asn Ser Val Val Leu Tyr Ser Thr Pro Pro Ile
1               5                   10

<210> SEQ ID NO 6
<211> LENGTH: 13
<212> TYPE: PRT
<213> ORGANISM: Artificial Sequence
<220> FEATURE:
<223> OTHER INFORMATION: FGFR1_761_773

<400> SEQUENCE: 6

Thr Ser Asn Gln Glu Tyr Leu Asp Leu Ser Met Pro Leu
1               5                   10

<210> SEQ ID NO 7
<211> LENGTH: 13
<212> TYPE: PRT
<213> ORGANISM: Artificial Sequence
<220> FEATURE:
<223> OTHER INFORMATION: K2C6B_53_65

<400> SEQUENCE: 7

Gly Ala Gly Phe Gly Ser Arg Ser Leu Tyr Gly Leu Gly
1               5                   10

<210> SEQ ID NO 8
<211> LENGTH: 13
<212> TYPE: PRT
<213> ORGANISM: Artificial Sequence
<220> FEATURE:
<223> OTHER INFORMATION: PRRX2_202_214

<400> SEQUENCE: 8

Trp Thr Ala Ser Ser Pro Tyr Ser Thr Val Pro Pro Tyr
1               5                   10

<210> SEQ ID NO 9
<211> LENGTH: 13
<212> TYPE: PRT
<213> ORGANISM: Artificial Sequence
<220> FEATURE:
<223> OTHER INFORMATION: VGFR3_1061_1073

<400> SEQUENCE: 9

Asp Ile Tyr Lys Asp Pro Asp Tyr Val Arg Lys Gly Ser
1               5                   10

<210> SEQ ID NO 10
<211> LENGTH: 13
<212> TYPE: PRT
```

```
<213> ORGANISM: Artificial Sequence
<220> FEATURE:
<223> OTHER INFORMATION: PGFRB_709_721

<400> SEQUENCE: 10

Arg Pro Pro Ser Ala Glu Leu Tyr Ser Asn Ala Leu Pro
1               5                   10

<210> SEQ ID NO 11
<211> LENGTH: 13
<212> TYPE: PRT
<213> ORGANISM: Artificial Sequence
<220> FEATURE:
<223> OTHER INFORMATION: FGFR2_762_774

<400> SEQUENCE: 11

Thr Leu Thr Thr Asn Glu Glu Tyr Leu Asp Leu Ser Gln
1               5                   10

<210> SEQ ID NO 12
<211> LENGTH: 13
<212> TYPE: PRT
<213> ORGANISM: Artificial Sequence
<220> FEATURE:
<223> OTHER INFORMATION: EGFR_1165_1177

<400> SEQUENCE: 12

Ile Ser Leu Asp Asn Pro Asp Tyr Gln Gln Asp Phe Phe
1               5                   10

<210> SEQ ID NO 13
<211> LENGTH: 13
<212> TYPE: PRT
<213> ORGANISM: Artificial Sequence
<220> FEATURE:
<223> OTHER INFORMATION: VGFR1_1320_1332_C1320S/C1321S

<400> SEQUENCE: 13

Ser Ser Ser Pro Pro Asp Tyr Asn Ser Val Val Leu
1               5                   10

<210> SEQ ID NO 14
<211> LENGTH: 13
<212> TYPE: PRT
<213> ORGANISM: Artificial Sequence
<220> FEATURE:
<223> OTHER INFORMATION: RON_1353_1365

<400> SEQUENCE: 14

Tyr Val Gln Leu Pro Ala Thr Tyr Met Asn Leu Gly Pro
1               5                   10

<210> SEQ ID NO 15
<211> LENGTH: 13
<212> TYPE: PRT
<213> ORGANISM: Artificial Sequence
<220> FEATURE:
<223> OTHER INFORMATION: PGFRB_768_780

<400> SEQUENCE: 15

Ser Ser Asn Tyr Met Ala Pro Tyr Asp Asn Tyr Val Pro
1               5                   10

<210> SEQ ID NO 16
<211> LENGTH: 13
<212> TYPE: PRT
<213> ORGANISM: Artificial Sequence
```

```
<220> FEATURE:
<223> OTHER INFORMATION: RET_1022_1034

<400> SEQUENCE: 16

Thr Pro Ser Asp Ser Leu Ile Tyr Asp Asp Gly Leu Ser
1               5                   10

<210> SEQ ID NO 17
<211> LENGTH: 13
<212> TYPE: PRT
<213> ORGANISM: Artificial Sequence
<220> FEATURE:
<223> OTHER INFORMATION: ANXA1_14_26

<400> SEQUENCE: 17

Ile Glu Asn Glu Glu Gln Glu Tyr Val Gln Thr Val Lys
1               5                   10

<210> SEQ ID NO 18
<211> LENGTH: 13
<212> TYPE: PRT
<213> ORGANISM: Artificial Sequence
<220> FEATURE:
<223> OTHER INFORMATION: FGFR3_753_765

<400> SEQUENCE: 18

Thr Val Thr Ser Thr Asp Glu Tyr Leu Asp Leu Ser Ala
1               5                   10

<210> SEQ ID NO 19
<211> LENGTH: 13
<212> TYPE: PRT
<213> ORGANISM: Artificial Sequence
<220> FEATURE:
<223> OTHER INFORMATION: ODBA_340_352

<400> SEQUENCE: 19

Asp Asp Ser Ser Ala Tyr Arg Ser Val Asp Glu Val Asn
1               5                   10

<210> SEQ ID NO 20
<211> LENGTH: 13
<212> TYPE: PRT
<213> ORGANISM: Artificial Sequence
<220> FEATURE:
<223> OTHER INFORMATION: PDPK1_2_14

<400> SEQUENCE: 20

Ala Arg Thr Thr Ser Gln Leu Tyr Asp Ala Val Pro Ile
1               5                   10

<210> SEQ ID NO 21
<211> LENGTH: 13
<212> TYPE: PRT
<213> ORGANISM: Artificial Sequence
<220> FEATURE:
<223> OTHER INFORMATION: TEC_512_524

<400> SEQUENCE: 21

Arg Tyr Phe Leu Asp Asp Gln Tyr Thr Ser Ser Ser Gly
1               5                   10

<210> SEQ ID NO 22
<211> LENGTH: 13
<212> TYPE: PRT
<213> ORGANISM: Artificial Sequence
<220> FEATURE:
```

```
<223> OTHER INFORMATION: FER_707_719

<400> SEQUENCE: 22

Arg Gln Glu Asp Gly Gly Val Tyr Ser Ser Ser Gly Leu
1               5                   10

<210> SEQ ID NO 23
<211> LENGTH: 13
<212> TYPE: PRT
<213> ORGANISM: Artificial Sequence
<220> FEATURE:
<223> OTHER INFORMATION: PGFRB_1002_1014

<400> SEQUENCE: 23

Leu Asp Thr Ser Ser Val Leu Tyr Thr Ala Val Gln Pro
1               5                   10

<210> SEQ ID NO 24
<211> LENGTH: 13
<212> TYPE: PRT
<213> ORGANISM: Artificial Sequence
<220> FEATURE:
<223> OTHER INFORMATION: CBL_693_705

<400> SEQUENCE: 24

Glu Gly Glu Glu Asp Thr Glu Tyr Met Thr Pro Ser Ser
1               5                   10

<210> SEQ ID NO 25
<211> LENGTH: 13
<212> TYPE: PRT
<213> ORGANISM: Artificial Sequence
<220> FEATURE:
<223> OTHER INFORMATION: RB_804_816

<400> SEQUENCE: 25

Ile Tyr Ile Ser Pro Leu Lys Ser Pro Tyr Lys Ile Ser
1               5                   10

<210> SEQ ID NO 26
<211> LENGTH: 13
<212> TYPE: PRT
<213> ORGANISM: Artificial Sequence
<220> FEATURE:
<223> OTHER INFORMATION: VGFR2_1052_1064

<400> SEQUENCE: 26

Asp Ile Tyr Lys Asp Pro Asp Tyr Val Arg Lys Gly Asp
1               5                   10

<210> SEQ ID NO 27
<211> LENGTH: 13
<212> TYPE: PRT
<213> ORGANISM: Artificial Sequence
<220> FEATURE:
<223> OTHER INFORMATION: FAK1_569_581

<400> SEQUENCE: 27

Arg Tyr Met Glu Asp Ser Thr Tyr Tyr Lys Ala Ser Lys
1               5                   10

<210> SEQ ID NO 28
<211> LENGTH: 13
<212> TYPE: PRT
<213> ORGANISM: Artificial Sequence
<220> FEATURE:
<223> OTHER INFORMATION: MET_1227_1239
```

<400> SEQUENCE: 28

Arg Asp Met Tyr Asp Lys Glu Tyr Tyr Ser Val His Asn
1               5                   10

<210> SEQ ID NO 29
<211> LENGTH: 13
<212> TYPE: PRT
<213> ORGANISM: Artificial Sequence
<220> FEATURE:
<223> OTHER INFORMATION: NTRK2_696_708

<400> SEQUENCE: 29

Gly Met Ser Arg Asp Val Tyr Ser Thr Asp Tyr Tyr Arg
1               5                   10

<210> SEQ ID NO 30
<211> LENGTH: 13
<212> TYPE: PRT
<213> ORGANISM: Artificial Sequence
<220> FEATURE:
<223> OTHER INFORMATION: DYR1A_312_324

<400> SEQUENCE: 30

Cys Gln Leu Gly Gln Arg Ile Tyr Gln Tyr Ile Gln Ser
1               5                   10

<210> SEQ ID NO 31
<211> LENGTH: 13
<212> TYPE: PRT
<213> ORGANISM: Artificial Sequence
<220> FEATURE:
<223> OTHER INFORMATION: CD3Z_146_158

<400> SEQUENCE: 31

Ser Thr Ala Thr Lys Asp Thr Tyr Asp Ala Leu His Met
1               5                   10

<210> SEQ ID NO 32
<211> LENGTH: 13
<212> TYPE: PRT
<213> ORGANISM: Artificial Sequence
<220> FEATURE:
<223> OTHER INFORMATION: DCX_109_121

<400> SEQUENCE: 32

Gly Ile Val Tyr Ala Val Ser Ser Asp Arg Phe Arg Ser
1               5                   10

<210> SEQ ID NO 33
<211> LENGTH: 13
<212> TYPE: PRT
<213> ORGANISM: Artificial Sequence
<220> FEATURE:
<223> OTHER INFORMATION: PGFRB_771_783

<400> SEQUENCE: 33

Tyr Met Ala Pro Tyr Asp Asn Tyr Val Pro Ser Ala Pro
1               5                   10

<210> SEQ ID NO 34
<211> LENGTH: 13
<212> TYPE: PRT
<213> ORGANISM: Artificial Sequence
<220> FEATURE:
<223> OTHER INFORMATION: LCK_387_399

```
<400> SEQUENCE: 34

Arg Leu Ile Glu Asp Asn Glu Tyr Thr Ala Arg Glu Gly
1               5                   10

<210> SEQ ID NO 35
<211> LENGTH: 13
<212> TYPE: PRT
<213> ORGANISM: Artificial Sequence
<220> FEATURE:
<223> OTHER INFORMATION: JAK1_1015_1027

<400> SEQUENCE: 35

Ala Ile Glu Thr Asp Lys Glu Tyr Tyr Thr Val Lys Asp
1               5                   10

<210> SEQ ID NO 36
<211> LENGTH: 13
<212> TYPE: PRT
<213> ORGANISM: Artificial Sequence
<220> FEATURE:
<223> OTHER INFORMATION: VGFR2_1168_1180

<400> SEQUENCE: 36

Ala Gln Gln Asp Gly Lys Asp Tyr Ile Val Leu Pro Ile
1               5                   10

<210> SEQ ID NO 37
<211> LENGTH: 13
<212> TYPE: PRT
<213> ORGANISM: Artificial Sequence
<220> FEATURE:
<223> OTHER INFORMATION: MK07_211_223

<400> SEQUENCE: 37

Ala Glu His Gln Tyr Phe Met Thr Glu Tyr Val Ala Thr
1               5                   10

<210> SEQ ID NO 38
<211> LENGTH: 13
<212> TYPE: PRT
<213> ORGANISM: Artificial Sequence
<220> FEATURE:
<223> OTHER INFORMATION: MBP_198_210

<400> SEQUENCE: 38

Ala Arg Thr Ala His Tyr Gly Ser Leu Pro Gln Lys Ser
1               5                   10

<210> SEQ ID NO 39
<211> LENGTH: 13
<212> TYPE: PRT
<213> ORGANISM: Artificial Sequence
<220> FEATURE:
<223> OTHER INFORMATION: B3AT_39_51

<400> SEQUENCE: 39

Thr Glu Ala Thr Ala Thr Asp Tyr His Thr Thr Ser His
1               5                   10

<210> SEQ ID NO 40
<211> LENGTH: 13
<212> TYPE: PRT
<213> ORGANISM: Artificial Sequence
<220> FEATURE:
<223> OTHER INFORMATION: CD3Z_116_128

<400> SEQUENCE: 40
```

```
Lys Asp Lys Met Ala Glu Ala Tyr Ser Glu Ile Gly Met
1               5                   10

<210> SEQ ID NO 41
<211> LENGTH: 13
<212> TYPE: PRT
<213> ORGANISM: Artificial Sequence
<220> FEATURE:
<223> OTHER INFORMATION: ANXA2_17_29

<400> SEQUENCE: 41

His Ser Thr Pro Pro Ser Ala Tyr Gly Ser Val Lys Ala
1               5                   10

<210> SEQ ID NO 42
<211> LENGTH: 13
<212> TYPE: PRT
<213> ORGANISM: Artificial Sequence
<220> FEATURE:
<223> OTHER INFORMATION: EGFR_1190_1202

<400> SEQUENCE: 42

Ser Thr Ala Glu Asn Ala Glu Tyr Leu Arg Val Ala Pro
1               5                   10

<210> SEQ ID NO 43
<211> LENGTH: 13
<212> TYPE: PRT
<213> ORGANISM: Artificial Sequence
<220> FEATURE:
<223> OTHER INFORMATION: CALM_95_107

<400> SEQUENCE: 43

Lys Asp Gly Asn Gly Tyr Ile Ser Ala Ala Glu Leu Arg
1               5                   10

<210> SEQ ID NO 44
<211> LENGTH: 13
<212> TYPE: PRT
<213> ORGANISM: Artificial Sequence
<220> FEATURE:
<223> OTHER INFORMATION: PECA1_706_718

<400> SEQUENCE: 44

Lys Lys Asp Thr Glu Thr Val Tyr Ser Glu Val Arg Lys
1               5                   10

<210> SEQ ID NO 45
<211> LENGTH: 13
<212> TYPE: PRT
<213> ORGANISM: Artificial Sequence
<220> FEATURE:
<223> OTHER INFORMATION: EPOR_361_373

<400> SEQUENCE: 45

Ser Glu His Ala Gln Asp Thr Tyr Leu Val Leu Asp Lys
1               5                   10

<210> SEQ ID NO 46
<211> LENGTH: 13
<212> TYPE: PRT
<213> ORGANISM: Artificial Sequence
<220> FEATURE:
<223> OTHER INFORMATION: EPHA2_765_777

<400> SEQUENCE: 46
```

```
Glu Asp Asp Pro Glu Ala Thr Tyr Thr Thr Ser Gly Gly
1               5                   10
```

<210> SEQ ID NO 47
<211> LENGTH: 13
<212> TYPE: PRT
<213> ORGANISM: Artificial Sequence
<220> FEATURE:
<223> OTHER INFORMATION: STAT4_714_726

<400> SEQUENCE: 47

```
Pro Ser Asp Leu Leu Pro Met Ser Pro Ser Val Tyr Ala
1               5                   10
```

<210> SEQ ID NO 48
<211> LENGTH: 13
<212> TYPE: PRT
<213> ORGANISM: Artificial Sequence
<220> FEATURE:
<223> OTHER INFORMATION: FES_706_718

<400> SEQUENCE: 48

```
Arg Glu Glu Ala Asp Gly Val Tyr Ala Ala Ser Gly Gly
1               5                   10
```

<210> SEQ ID NO 49
<211> LENGTH: 13
<212> TYPE: PRT
<213> ORGANISM: Artificial Sequence
<220> FEATURE:
<223> OTHER INFORMATION: EPHB1_771_783

<400> SEQUENCE: 49

```
Asp Asp Thr Ser Asp Pro Thr Tyr Thr Ser Ser Leu Gly
1               5                   10
```

<210> SEQ ID NO 50
<211> LENGTH: 13
<212> TYPE: PRT
<213> ORGANISM: Artificial Sequence
<220> FEATURE:
<223> OTHER INFORMATION: PP2AB_297_309

<400> SEQUENCE: 50

```
Glu Pro His Val Thr Arg Arg Thr Pro Asp Tyr Phe Leu
1               5                   10
```

<210> SEQ ID NO 51
<211> LENGTH: 13
<212> TYPE: PRT
<213> ORGANISM: Artificial Sequence
<220> FEATURE:
<223> OTHER INFORMATION: CRK_214_226

<400> SEQUENCE: 51

```
Gly Pro Pro Glu Pro Gly Pro Tyr Ala Gln Pro Ser Val
1               5                   10
```

<210> SEQ ID NO 52
<211> LENGTH: 13
<212> TYPE: PRT
<213> ORGANISM: Artificial Sequence
<220> FEATURE:
<223> OTHER INFORMATION: LAT_249_261

<400> SEQUENCE: 52

```
Glu Glu Gly Ala Pro Asp Tyr Glu Asn Leu Gln Glu Leu
```

<210> SEQ ID NO 53
<211> LENGTH: 13
<212> TYPE: PRT
<213> ORGANISM: Artificial Sequence
<220> FEATURE:
<223> OTHER INFORMATION: VGFR2_989_1001

<400> SEQUENCE: 53

Glu Glu Ala Pro Glu Asp Leu Tyr Lys Asp Phe Leu Thr
1               5                   10

<210> SEQ ID NO 54
<211> LENGTH: 13
<212> TYPE: PRT
<213> ORGANISM: Artificial Sequence
<220> FEATURE:
<223> OTHER INFORMATION: FAK2_572_584

<400> SEQUENCE: 54

Arg Tyr Ile Glu Asp Glu Asp Tyr Tyr Lys Ala Ser Val
1               5                   10

<210> SEQ ID NO 55
<211> LENGTH: 13
<212> TYPE: PRT
<213> ORGANISM: Artificial Sequence
<220> FEATURE:
<223> OTHER INFORMATION: CDK2_8_20

<400> SEQUENCE: 55

Glu Lys Ile Gly Glu Gly Thr Tyr Gly Val Val Tyr Lys
1               5                   10

<210> SEQ ID NO 56
<211> LENGTH: 13
<212> TYPE: PRT
<213> ORGANISM: Artificial Sequence
<220> FEATURE:
<223> OTHER INFORMATION: CTNB1_79_91

<400> SEQUENCE: 56

Val Ala Asp Ile Asp Gly Gln Tyr Ala Met Thr Arg Ala
1               5                   10

<210> SEQ ID NO 57
<211> LENGTH: 13
<212> TYPE: PRT
<213> ORGANISM: Artificial Sequence
<220> FEATURE:
<223> OTHER INFORMATION: ERBB2_1241_1253

<400> SEQUENCE: 57

Pro Thr Ala Glu Asn Pro Glu Tyr Leu Gly Leu Asp Val
1               5                   10

<210> SEQ ID NO 58
<211> LENGTH: 13
<212> TYPE: PRT
<213> ORGANISM: Artificial Sequence
<220> FEATURE:
<223> OTHER INFORMATION: RON_1346_1358

<400> SEQUENCE: 58

Ser Ala Leu Leu Gly Asp His Tyr Val Gln Leu Pro Ala
1               5                   10

```
<210> SEQ ID NO 59
<211> LENGTH: 15
<212> TYPE: PRT
<213> ORGANISM: Artificial Sequence
<220> FEATURE:
<223> OTHER INFORMATION: PGFRB_1014_1028

<400> SEQUENCE: 59

Pro Asn Glu Gly Asp Asn Asp Tyr Ile Ile Pro Leu Pro Asp Pro
1               5                   10                  15

<210> SEQ ID NO 60
<211> LENGTH: 13
<212> TYPE: PRT
<213> ORGANISM: Artificial Sequence
<220> FEATURE:
<223> OTHER INFORMATION: EPHA1_774_786

<400> SEQUENCE: 60

Leu Asp Asp Phe Asp Gly Thr Tyr Glu Thr Gln Gly Gly
1               5                   10

<210> SEQ ID NO 61
<211> LENGTH: 13
<212> TYPE: PRT
<213> ORGANISM: Artificial Sequence
<220> FEATURE:
<223> OTHER INFORMATION: ZAP70_485_497

<400> SEQUENCE: 61

Ala Leu Gly Ala Asp Asp Ser Tyr Tyr Thr Ala Arg Ser
1               5                   10

<210> SEQ ID NO 62
<211> LENGTH: 13
<212> TYPE: PRT
<213> ORGANISM: Artificial Sequence
<220> FEATURE:
<223> OTHER INFORMATION: ERBB4_1181_1193

<400> SEQUENCE: 62

Gln Ala Leu Asp Asn Pro Glu Tyr His Asn Ala Ser Asn
1               5                   10

<210> SEQ ID NO 63
<211> LENGTH: 13
<212> TYPE: PRT
<213> ORGANISM: Artificial Sequence
<220> FEATURE:
<223> OTHER INFORMATION: 41_654_666

<400> SEQUENCE: 63

Leu Asp Gly Glu Asn Ile Tyr Ile Arg His Ser Asn Leu
1               5                   10

<210> SEQ ID NO 64
<211> LENGTH: 13
<212> TYPE: PRT
<213> ORGANISM: Artificial Sequence
<220> FEATURE:
<223> OTHER INFORMATION: MK01_180_192

<400> SEQUENCE: 64

His Thr Gly Phe Leu Thr Glu Tyr Val Ala Thr Arg Trp
1               5                   10
```

```
<210> SEQ ID NO 65
<211> LENGTH: 13
<212> TYPE: PRT
<213> ORGANISM: Artificial Sequence
<220> FEATURE:
<223> OTHER INFORMATION: VGFR2_1046_1058

<400> SEQUENCE: 65

Asp Phe Gly Leu Ala Arg Asp Ile Tyr Lys Asp Pro Asp
1               5                   10

<210> SEQ ID NO 66
<211> LENGTH: 13
<212> TYPE: PRT
<213> ORGANISM: Artificial Sequence
<220> FEATURE:
<223> OTHER INFORMATION: PAXI_24_36

<400> SEQUENCE: 66

Phe Leu Ser Glu Glu Thr Pro Tyr Ser Tyr Pro Thr Gly
1               5                   10

<210> SEQ ID NO 67
<211> LENGTH: 13
<212> TYPE: PRT
<213> ORGANISM: Artificial Sequence
<220> FEATURE:
<223> OTHER INFORMATION: RAF1_332_344

<400> SEQUENCE: 67

Pro Arg Gly Gln Arg Asp Ser Ser Tyr Tyr Trp Glu Ile
1               5                   10

<210> SEQ ID NO 68
<211> LENGTH: 13
<212> TYPE: PRT
<213> ORGANISM: Artificial Sequence
<220> FEATURE:
<223> OTHER INFORMATION: ACHD_383_395

<400> SEQUENCE: 68

Tyr Ile Ser Lys Ala Glu Glu Tyr Phe Leu Leu Lys Ser
1               5                   10

<210> SEQ ID NO 69
<211> LENGTH: 13
<212> TYPE: PRT
<213> ORGANISM: Artificial Sequence
<220> FEATURE:
<223> OTHER INFORMATION: FRK_380_392

<400> SEQUENCE: 69

Lys Val Asp Asn Glu Asp Ile Tyr Glu Ser Arg His Glu
1               5                   10

<210> SEQ ID NO 70
<211> LENGTH: 13
<212> TYPE: PRT
<213> ORGANISM: Artificial Sequence
<220> FEATURE:
<223> OTHER INFORMATION: KSYK_518_530

<400> SEQUENCE: 70

Ala Leu Arg Ala Asp Glu Asn Tyr Tyr Lys Ala Gln Thr
1               5                   10
```

-continued

```
<210> SEQ ID NO 71
<211> LENGTH: 13
<212> TYPE: PRT
<213> ORGANISM: Artificial Sequence
<220> FEATURE:
<223> OTHER INFORMATION: RASA1_453_465

<400> SEQUENCE: 71

Thr Val Asp Gly Lys Glu Ile Tyr Asn Thr Ile Arg Arg
1               5                   10

<210> SEQ ID NO 72
<211> LENGTH: 13
<212> TYPE: PRT
<213> ORGANISM: Artificial Sequence
<220> FEATURE:
<223> OTHER INFORMATION: PLCG1_764_776

<400> SEQUENCE: 72

Ile Gly Thr Ala Glu Pro Asp Tyr Gly Ala Leu Tyr Glu
1               5                   10

<210> SEQ ID NO 73
<211> LENGTH: 13
<212> TYPE: PRT
<213> ORGANISM: Artificial Sequence
<220> FEATURE:
<223> OTHER INFORMATION: K2C8_425_437

<400> SEQUENCE: 73

Ser Ala Tyr Gly Gly Leu Thr Ser Pro Gly Leu Ser Tyr
1               5                   10

<210> SEQ ID NO 74
<211> LENGTH: 12
<212> TYPE: PRT
<213> ORGANISM: Artificial Sequence
<220> FEATURE:
<223> OTHER INFORMATION: ART_004_EAIYAAPFAKKKXC

<400> SEQUENCE: 74

Glu Ala Ile Tyr Ala Ala Pro Phe Ala Lys Lys Lys
1               5                   10

<210> SEQ ID NO 75
<211> LENGTH: 13
<212> TYPE: PRT
<213> ORGANISM: Artificial Sequence
<220> FEATURE:
<223> OTHER INFORMATION: EPOR_419_431

<400> SEQUENCE: 75

Ala Ser Ala Ala Ser Phe Glu Tyr Thr Ile Leu Asp Pro
1               5                   10

<210> SEQ ID NO 76
<211> LENGTH: 13
<212> TYPE: PRT
<213> ORGANISM: Artificial Sequence
<220> FEATURE:
<223> OTHER INFORMATION: EGFR_1103_1115

<400> SEQUENCE: 76

Gly Ser Val Gln Asn Pro Val Tyr His Asn Gln Pro Leu
1               5                   10

<210> SEQ ID NO 77
```

```
<211> LENGTH: 15
<212> TYPE: PRT
<213> ORGANISM: Artificial Sequence
<220> FEATURE:
<223> OTHER INFORMATION: JAK2_563_577

<400> SEQUENCE: 77

Val Arg Arg Glu Val Gly Asp Tyr Gly Gln Leu His Glu Thr Glu
1               5                   10                  15

<210> SEQ ID NO 78
<211> LENGTH: 13
<212> TYPE: PRT
<213> ORGANISM: Artificial Sequence
<220> FEATURE:
<223> OTHER INFORMATION: MK10_216_228

<400> SEQUENCE: 78

Thr Ser Phe Met Met Thr Pro Tyr Val Val Thr Arg Tyr
1               5                   10

<210> SEQ ID NO 79
<211> LENGTH: 13
<212> TYPE: PRT
<213> ORGANISM: Artificial Sequence
<220> FEATURE:
<223> OTHER INFORMATION: DYR1A_212_224

<400> SEQUENCE: 79

Lys His Asp Thr Glu Met Lys Tyr Tyr Ile Val His Leu
1               5                   10

<210> SEQ ID NO 80
<211> LENGTH: 13
<212> TYPE: PRT
<213> ORGANISM: Artificial Sequence
<220> FEATURE:
<223> OTHER INFORMATION: P85A_600_612

<400> SEQUENCE: 80

Asn Glu Asn Thr Glu Asp Gln Tyr Ser Leu Val Glu Asp
1               5                   10

<210> SEQ ID NO 81
<211> LENGTH: 13
<212> TYPE: PRT
<213> ORGANISM: Artificial Sequence
<220> FEATURE:
<223> OTHER INFORMATION: PAXI_111_123

<400> SEQUENCE: 81

Val Gly Glu Glu Glu His Val Tyr Ser Phe Pro Asn Lys
1               5                   10

<210> SEQ ID NO 82
<211> LENGTH: 13
<212> TYPE: PRT
<213> ORGANISM: Artificial Sequence
<220> FEATURE:
<223> OTHER INFORMATION: EPHB4_583_595

<400> SEQUENCE: 82

Ile Gly His Gly Thr Lys Val Tyr Ile Asp Pro Phe Thr
1               5                   10

<210> SEQ ID NO 83
<211> LENGTH: 13
```

```
<212> TYPE: PRT
<213> ORGANISM: Artificial Sequence
<220> FEATURE:
<223> OTHER INFORMATION: MK12_178_190

<400> SEQUENCE: 83

Ala Asp Ser Glu Met Thr Gly Tyr Val Val Thr Arg Trp
1               5                   10

<210> SEQ ID NO 84
<211> LENGTH: 13
<212> TYPE: PRT
<213> ORGANISM: Artificial Sequence
<220> FEATURE:
<223> OTHER INFORMATION: VGFR1_1040_1052

<400> SEQUENCE: 84

Asp Phe Gly Leu Ala Arg Asp Ile Tyr Lys Asn Pro Asp
1               5                   10

<210> SEQ ID NO 85
<211> LENGTH: 13
<212> TYPE: PRT
<213> ORGANISM: Artificial Sequence
<220> FEATURE:
<223> OTHER INFORMATION: PGFRB_572_584

<400> SEQUENCE: 85

Val Ser Ser Asp Gly His Glu Tyr Ile Tyr Val Asp Pro
1               5                   10

<210> SEQ ID NO 86
<211> LENGTH: 13
<212> TYPE: PRT
<213> ORGANISM: Artificial Sequence
<220> FEATURE:
<223> OTHER INFORMATION: EPHA7_607_619

<400> SEQUENCE: 86

Thr Tyr Ile Asp Pro Glu Thr Tyr Glu Asp Pro Asn Arg
1               5                   10

<210> SEQ ID NO 87
<211> LENGTH: 13
<212> TYPE: PRT
<213> ORGANISM: Artificial Sequence
<220> FEATURE:
<223> OTHER INFORMATION: ERBB2_870_882

<400> SEQUENCE: 87

Leu Asp Ile Asp Glu Thr Glu Tyr His Ala Asp Gly Gly
1               5                   10

<210> SEQ ID NO 88
<211> LENGTH: 13
<212> TYPE: PRT
<213> ORGANISM: Artificial Sequence
<220> FEATURE:
<223> OTHER INFORMATION: LAT_194_206

<400> SEQUENCE: 88

Met Glu Ser Ile Asp Asp Tyr Val Asn Val Pro Glu Ser
1               5                   10

<210> SEQ ID NO 89
<211> LENGTH: 13
<212> TYPE: PRT
```

```
<213> ORGANISM: Artificial Sequence
<220> FEATURE:
<223> OTHER INFORMATION: VINC_815_827

<400> SEQUENCE: 89

Lys Ser Phe Leu Asp Ser Gly Tyr Arg Ile Leu Gly Ala
1               5                   10

<210> SEQ ID NO 90
<211> LENGTH: 13
<212> TYPE: PRT
<213> ORGANISM: Artificial Sequence
<220> FEATURE:
<223> OTHER INFORMATION: NCF1_313_325

<400> SEQUENCE: 90

Gln Arg Ser Arg Lys Arg Leu Ser Gln Asp Ala Tyr Arg
1               5                   10

<210> SEQ ID NO 91
<211> LENGTH: 13
<212> TYPE: PRT
<213> ORGANISM: Artificial Sequence
<220> FEATURE:
<223> OTHER INFORMATION: ERBB4_1277_1289

<400> SEQUENCE: 91

Ile Val Ala Glu Asn Pro Glu Tyr Leu Ser Glu Phe Ser
1               5                   10

<210> SEQ ID NO 92
<211> LENGTH: 13
<212> TYPE: PRT
<213> ORGANISM: Artificial Sequence
<220> FEATURE:
<223> OTHER INFORMATION: VGFR2_944_956

<400> SEQUENCE: 92

Arg Phe Arg Gln Gly Lys Asp Tyr Val Gly Ala Ile Pro
1               5                   10

<210> SEQ ID NO 93
<211> LENGTH: 13
<212> TYPE: PRT
<213> ORGANISM: Artificial Sequence
<220> FEATURE:
<223> OTHER INFORMATION: NPT2A_501_513

<400> SEQUENCE: 93

Ala Lys Ala Leu Gly Lys Arg Thr Ala Lys Tyr Arg Trp
1               5                   10

<210> SEQ ID NO 94
<211> LENGTH: 13
<212> TYPE: PRT
<213> ORGANISM: Artificial Sequence
<220> FEATURE:
<223> OTHER INFORMATION: C1R_199_211

<400> SEQUENCE: 94

Thr Glu Ala Ser Gly Tyr Ile Ser Ser Leu Glu Tyr Pro
1               5                   10

<210> SEQ ID NO 95
<211> LENGTH: 13
<212> TYPE: PRT
<213> ORGANISM: Artificial Sequence
```

```
<220> FEATURE:
<223> OTHER INFORMATION: FABPH_13_25

<400> SEQUENCE: 95

Asp Ser Lys Asn Phe Asp Asp Tyr Met Lys Ser Leu Gly
1               5                   10

<210> SEQ ID NO 96
<211> LENGTH: 13
<212> TYPE: PRT
<213> ORGANISM: Artificial Sequence
<220> FEATURE:
<223> OTHER INFORMATION: STAT1_694_706

<400> SEQUENCE: 96

Asp Gly Pro Lys Gly Thr Gly Tyr Ile Lys Thr Glu Leu
1               5                   10

<210> SEQ ID NO 97
<211> LENGTH: 13
<212> TYPE: PRT
<213> ORGANISM: Artificial Sequence
<220> FEATURE:
<223> OTHER INFORMATION: EPHA4_589_601

<400> SEQUENCE: 97

Leu Asn Gln Gly Val Arg Thr Tyr Val Asp Pro Phe Thr
1               5                   10

<210> SEQ ID NO 98
<211> LENGTH: 13
<212> TYPE: PRT
<213> ORGANISM: Artificial Sequence
<220> FEATURE:
<223> OTHER INFORMATION: VGFR1_1046_1058_Y1048F

<400> SEQUENCE: 98

Asp Ile Phe Lys Asn Pro Asp Tyr Val Arg Lys Gly Asp
1               5                   10

<210> SEQ ID NO 99
<211> LENGTH: 13
<212> TYPE: PRT
<213> ORGANISM: Artificial Sequence
<220> FEATURE:
<223> OTHER INFORMATION: INSR_992_1004

<400> SEQUENCE: 99

Tyr Ala Ser Ser Asn Pro Glu Tyr Leu Ser Ala Ser Asp
1               5                   10

<210> SEQ ID NO 100
<211> LENGTH: 13
<212> TYPE: PRT
<213> ORGANISM: Artificial Sequence
<220> FEATURE:
<223> OTHER INFORMATION: NTRK2_509_521

<400> SEQUENCE: 100

Pro Val Ile Glu Asn Pro Gln Tyr Phe Gly Ile Thr Asn
1               5                   10

<210> SEQ ID NO 101
<211> LENGTH: 13
<212> TYPE: PRT
<213> ORGANISM: Artificial Sequence
<220> FEATURE:
```

```
<223> OTHER INFORMATION: MBP_259_271

<400> SEQUENCE: 101

Phe Gly Tyr Gly Gly Arg Ala Ser Asp Tyr Lys Ser Ala
1               5                   10

<210> SEQ ID NO 102
<211> LENGTH: 13
<212> TYPE: PRT
<213> ORGANISM: Artificial Sequence
<220> FEATURE:
<223> OTHER INFORMATION: STA5A_687_699

<400> SEQUENCE: 102

Leu Ala Lys Ala Val Asp Gly Tyr Val Lys Pro Gln Ile
1               5                   10

<210> SEQ ID NO 103
<211> LENGTH: 13
<212> TYPE: PRT
<213> ORGANISM: Artificial Sequence
<220> FEATURE:
<223> OTHER INFORMATION: NTRK1_489_501

<400> SEQUENCE: 103

His Ile Ile Glu Asn Pro Gln Tyr Phe Ser Asp Ala Cys
1               5                   10

<210> SEQ ID NO 104
<211> LENGTH: 13
<212> TYPE: PRT
<213> ORGANISM: Artificial Sequence
<220> FEATURE:
<223> OTHER INFORMATION: PTN11_539_551

<400> SEQUENCE: 104

Ser Lys Arg Lys Gly His Glu Tyr Thr Asn Ile Lys Tyr
1               5                   10

<210> SEQ ID NO 105
<211> LENGTH: 13
<212> TYPE: PRT
<213> ORGANISM: Artificial Sequence
<220> FEATURE:
<223> OTHER INFORMATION: PLCG1_776_788

<400> SEQUENCE: 105

Glu Gly Arg Asn Pro Gly Phe Tyr Val Glu Ala Asn Pro
1               5                   10

<210> SEQ ID NO 106
<211> LENGTH: 13
<212> TYPE: PRT
<213> ORGANISM: Artificial Sequence
<220> FEATURE:
<223> OTHER INFORMATION: MK14_173_185

<400> SEQUENCE: 106

Arg His Thr Asp Asp Glu Met Thr Gly Tyr Val Ala Thr
1               5                   10

<210> SEQ ID NO 107
<211> LENGTH: 13
<212> TYPE: PRT
<213> ORGANISM: Artificial Sequence
<220> FEATURE:
<223> OTHER INFORMATION: MBP_263_275
```

```
<400> SEQUENCE: 107

Gly Arg Ala Ser Asp Tyr Lys Ser Ala His Lys Gly Phe
1               5                   10

<210> SEQ ID NO 108
<211> LENGTH: 13
<212> TYPE: PRT
<213> ORGANISM: Artificial Sequence
<220> FEATURE:
<223> OTHER INFORMATION: RBL2_99_111

<400> SEQUENCE: 108

Val Pro Thr Val Ser Lys Gly Thr Val Glu Gly Asn Tyr
1               5                   10

<210> SEQ ID NO 109
<211> LENGTH: 13
<212> TYPE: PRT
<213> ORGANISM: Artificial Sequence
<220> FEATURE:
<223> OTHER INFORMATION: RET_680_692

<400> SEQUENCE: 109

Ala Gln Ala Phe Pro Val Ser Tyr Ser Ser Ser Gly Ala
1               5                   10

<210> SEQ ID NO 110
<211> LENGTH: 13
<212> TYPE: PRT
<213> ORGANISM: Artificial Sequence
<220> FEATURE:
<223> OTHER INFORMATION: EGFR_862_874

<400> SEQUENCE: 110

Leu Gly Ala Glu Glu Lys Glu Tyr His Ala Glu Gly Gly
1               5                   10

<210> SEQ ID NO 111
<211> LENGTH: 13
<212> TYPE: PRT
<213> ORGANISM: Artificial Sequence
<220> FEATURE:
<223> OTHER INFORMATION: INSR_1348_1360

<400> SEQUENCE: 111

Ser Leu Gly Phe Lys Arg Ser Tyr Glu Glu His Ile Pro
1               5                   10

<210> SEQ ID NO 112
<211> LENGTH: 13
<212> TYPE: PRT
<213> ORGANISM: Artificial Sequence
<220> FEATURE:
<223> OTHER INFORMATION: PRGR_545_557

<400> SEQUENCE: 112

Leu Arg Pro Asp Ser Glu Ala Ser Gln Ser Pro Gln Tyr
1               5                   10

<210> SEQ ID NO 113
<211> LENGTH: 13
<212> TYPE: PRT
<213> ORGANISM: Artificial Sequence
<220> FEATURE:
<223> OTHER INFORMATION: SRC8_CHICK_470_482
```

```
<400> SEQUENCE: 113

Val Ser Gln Arg Glu Ala Glu Tyr Glu Pro Glu Thr Val
1               5                   10

<210> SEQ ID NO 114
<211> LENGTH: 13
<212> TYPE: PRT
<213> ORGANISM: Artificial Sequence
<220> FEATURE:
<223> OTHER INFORMATION: EPHA2_581_593

<400> SEQUENCE: 114

Gln Leu Lys Pro Leu Lys Thr Tyr Val Asp Pro His Thr
1               5                   10

<210> SEQ ID NO 115
<211> LENGTH: 13
<212> TYPE: PRT
<213> ORGANISM: Artificial Sequence
<220> FEATURE:
<223> OTHER INFORMATION: VGFR1_1162_1174

<400> SEQUENCE: 115

Val Gln Gln Asp Gly Lys Asp Tyr Ile Pro Ile Asn Ala
1               5                   10

<210> SEQ ID NO 116
<211> LENGTH: 13
<212> TYPE: PRT
<213> ORGANISM: Artificial Sequence
<220> FEATURE:
<223> OTHER INFORMATION: MK01_198_210

<400> SEQUENCE: 116

Ile Met Leu Asn Ser Lys Gly Tyr Thr Lys Ser Ile Asp
1               5                   10

<210> SEQ ID NO 117
<211> LENGTH: 13
<212> TYPE: PRT
<213> ORGANISM: Artificial Sequence
<220> FEATURE:
<223> OTHER INFORMATION: STAT6_634_646

<400> SEQUENCE: 117

Met Gly Lys Asp Gly Arg Gly Tyr Val Pro Ala Thr Ile
1               5                   10

<210> SEQ ID NO 118
<211> LENGTH: 13
<212> TYPE: PRT
<213> ORGANISM: Artificial Sequence
<220> FEATURE:
<223> OTHER INFORMATION: VGFR2_1207_1219_C1208S

<400> SEQUENCE: 118

Val Ser Asp Pro Lys Phe His Tyr Asp Asn Thr Ala Gly
1               5                   10

<210> SEQ ID NO 119
<211> LENGTH: 13
<212> TYPE: PRT
<213> ORGANISM: Artificial Sequence
<220> FEATURE:
<223> OTHER INFORMATION: ZBT16_621_633

<400> SEQUENCE: 119
```

Leu Arg Thr His Asn Gly Ala Ser Pro Tyr Gln Cys Thr
1               5                   10

<210> SEQ ID NO 120
<211> LENGTH: 13
<212> TYPE: PRT
<213> ORGANISM: Artificial Sequence
<220> FEATURE:
<223> OTHER INFORMATION: EGFR_1118_1130

<400> SEQUENCE: 120

Ala Pro Ser Arg Asp Pro His Tyr Gln Asp Pro His Ser
1               5                   10

<210> SEQ ID NO 121
<211> LENGTH: 13
<212> TYPE: PRT
<213> ORGANISM: Artificial Sequence
<220> FEATURE:
<223> OTHER INFORMATION: AMPE_5_17

<400> SEQUENCE: 121

Glu Arg Glu Gly Ser Lys Arg Tyr Cys Ile Gln Thr Lys
1               5                   10

<210> SEQ ID NO 122
<211> LENGTH: 13
<212> TYPE: PRT
<213> ORGANISM: Artificial Sequence
<220> FEATURE:
<223> OTHER INFORMATION: FGFR3_641_653

<400> SEQUENCE: 122

Asp Val His Asn Leu Asp Tyr Tyr Lys Lys Thr Thr Asn
1               5                   10

<210> SEQ ID NO 123
<211> LENGTH: 13
<212> TYPE: PRT
<213> ORGANISM: Artificial Sequence
<220> FEATURE:
<223> OTHER INFORMATION: VGFR1_1206_1218

<400> SEQUENCE: 123

Gly Ser Ser Asp Asp Val Arg Tyr Val Asn Ala Phe Lys
1               5                   10

<210> SEQ ID NO 124
<211> LENGTH: 13
<212> TYPE: PRT
<213> ORGANISM: Artificial Sequence
<220> FEATURE:
<223> OTHER INFORMATION: EFS_246_258_Y253F

<400> SEQUENCE: 124

Gly Gly Thr Asp Glu Gly Ile Phe Asp Val Pro Leu Leu
1               5                   10

<210> SEQ ID NO 125
<211> LENGTH: 13
<212> TYPE: PRT
<213> ORGANISM: Artificial Sequence
<220> FEATURE:
<223> OTHER INFORMATION: ODPAT_291_303

<400> SEQUENCE: 125

Ser Met Ser Asp Pro Gly Val Ser Tyr Arg Thr Arg Glu
1               5                   10

<210> SEQ ID NO 126
<211> LENGTH: 13
<212> TYPE: PRT
<213> ORGANISM: Artificial Sequence
<220> FEATURE:
<223> OTHER INFORMATION: STAT4_686_698

<400> SEQUENCE: 126

Thr Glu Arg Gly Asp Lys Gly Tyr Val Pro Ser Val Phe
1               5                   10

<210> SEQ ID NO 127
<211> LENGTH: 13
<212> TYPE: PRT
<213> ORGANISM: Artificial Sequence
<220> FEATURE:
<223> OTHER INFORMATION: PLCG1_1246_1258

<400> SEQUENCE: 127

Glu Gly Ser Phe Glu Ser Arg Tyr Gln Gln Pro Phe Glu
1               5                   10

<210> SEQ ID NO 128
<211> LENGTH: 13
<212> TYPE: PRT
<213> ORGANISM: Artificial Sequence
<220> FEATURE:
<223> OTHER INFORMATION: TNNT1_2_14

<400> SEQUENCE: 128

Ser Asp Thr Glu Glu Gln Glu Tyr Glu Glu Glu Gln Pro
1               5                   10

<210> SEQ ID NO 129
<211> LENGTH: 13
<212> TYPE: PRT
<213> ORGANISM: Artificial Sequence
<220> FEATURE:
<223> OTHER INFORMATION: EGFR_908_920

<400> SEQUENCE: 129

Met Thr Phe Gly Ser Lys Pro Tyr Asp Gly Ile Pro Ala
1               5                   10

<210> SEQ ID NO 130
<211> LENGTH: 13
<212> TYPE: PRT
<213> ORGANISM: Artificial Sequence
<220> FEATURE:
<223> OTHER INFORMATION: EPHB1_921_933

<400> SEQUENCE: 130

Ser Ala Ile Lys Met Val Gln Tyr Arg Asp Ser Phe Leu
1               5                   10

<210> SEQ ID NO 131
<211> LENGTH: 13
<212> TYPE: PRT
<213> ORGANISM: Artificial Sequence
<220> FEATURE:
<223> OTHER INFORMATION: VGFR1_1235_1247

<400> SEQUENCE: 131

Ala Thr Ser Met Phe Asp Asp Tyr Gln Gly Asp Ser Ser

```
1               5                  10
```

<210> SEQ ID NO 132
<211> LENGTH: 13
<212> TYPE: PRT
<213> ORGANISM: Artificial Sequence
<220> FEATURE:
<223> OTHER INFORMATION: STAT3_698_710

<400> SEQUENCE: 132

```
Asp Pro Gly Ser Ala Ala Pro Tyr Leu Lys Thr Lys Phe
1               5                  10
```

<210> SEQ ID NO 133
<211> LENGTH: 13
<212> TYPE: PRT
<213> ORGANISM: Artificial Sequence
<220> FEATURE:
<223> OTHER INFORMATION: CALM_93_105

<400> SEQUENCE: 133

```
Phe Asp Lys Asp Gly Asn Gly Tyr Ile Ser Ala Ala Glu
1               5                  10
```

<210> SEQ ID NO 134
<211> LENGTH: 13
<212> TYPE: PRT
<213> ORGANISM: Artificial Sequence
<220> FEATURE:
<223> OTHER INFORMATION: DDR1_506_518

<400> SEQUENCE: 134

```
Leu Leu Leu Ser Asn Pro Ala Tyr Arg Leu Leu Leu Ala
1               5                  10
```

<210> SEQ ID NO 135
<211> LENGTH: 13
<212> TYPE: PRT
<213> ORGANISM: Artificial Sequence
<220> FEATURE:
<223> OTHER INFORMATION: EGFR_1062_1074

<400> SEQUENCE: 135

```
Glu Asp Ser Phe Leu Gln Arg Tyr Ser Ser Asp Pro Thr
1               5                  10
```

<210> SEQ ID NO 136
<211> LENGTH: 13
<212> TYPE: PRT
<213> ORGANISM: Artificial Sequence
<220> FEATURE:
<223> OTHER INFORMATION: EPHA4_921_933

<400> SEQUENCE: 136

```
Gln Ala Ile Lys Met Asp Arg Tyr Lys Asp Asn Phe Thr
1               5                  10
```

<210> SEQ ID NO 137
<211> LENGTH: 13
<212> TYPE: PRT
<213> ORGANISM: Artificial Sequence
<220> FEATURE:
<223> OTHER INFORMATION: PERI_458_470

<400> SEQUENCE: 137

```
Gln Arg Ser Glu Leu Asp Lys Ser Ser Ala His Ser Tyr
1               5                  10
```

<210> SEQ ID NO 138
<211> LENGTH: 13
<212> TYPE: PRT
<213> ORGANISM: Artificial Sequence
<220> FEATURE:
<223> OTHER INFORMATION: VGFR1_1049_1061

<400> SEQUENCE: 138

Lys Asn Pro Asp Tyr Val Arg Lys Gly Asp Thr Arg Leu
1               5                   10

<210> SEQ ID NO 139
<211> LENGTH: 10
<212> TYPE: PRT
<213> ORGANISM: Artificial Sequence
<220> FEATURE:
<223> OTHER INFORMATION: RET_1024_1033_Y1029npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 139

Ser Asp Ser Leu Ile Tyr Asp Asp Gly Leu
1               5                   10

<210> SEQ ID NO 140
<211> LENGTH: 10
<212> TYPE: PRT
<213> ORGANISM: Artificial Sequence
<220> FEATURE:
<223> OTHER INFORMATION: RET_682_691_Y687npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 140

Ala Phe Pro Val Ser Tyr Ser Ser Ser Gly
1               5                   10

<210> SEQ ID NO 141
<211> LENGTH: 10
<212> TYPE: PRT
<213> ORGANISM: Artificial Sequence
<220> FEATURE:
<223> OTHER INFORMATION: FRK_382_391_Y387npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 141

Asp Asn Glu Asp Ile Tyr Glu Ser Arg His
1               5                   10

<210> SEQ ID NO 142
<211> LENGTH: 10
<212> TYPE: PRT
<213> ORGANISM: Artificial Sequence
<220> FEATURE:
<223> OTHER INFORMATION: MK01_182_191_Y187npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 142

```
Phe Gly Leu Thr Glu Tyr Val Ala Thr Arg
1               5                   10

<210> SEQ ID NO 143
<211> LENGTH: 10
<212> TYPE: PRT
<213> ORGANISM: Artificial Sequence
<220> FEATURE:
<223> OTHER INFORMATION: MK01_198_207_Y203npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 143

Leu Asn Ser Lys Gly Tyr Thr Lys Ser Ile
1               5                   10

<210> SEQ ID NO 144
<211> LENGTH: 10
<212> TYPE: PRT
<213> ORGANISM: Artificial Sequence
<220> FEATURE:
<223> OTHER INFORMATION: CBL_695_704_Y700npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 144

Glu Glu Asp Thr Glu Tyr Asx Thr Pro Ser
1               5                   10

<210> SEQ ID NO 145
<211> LENGTH: 10
<212> TYPE: PRT
<213> ORGANISM: Artificial Sequence
<220> FEATURE:
<223> OTHER INFORMATION: P85A_602_611_Y607npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 145

Asn Thr Glu Asp Gln Tyr Ser Leu Val Glu
1               5                   10

<210> SEQ ID NO 146
<211> LENGTH: 10
<212> TYPE: PRT
<213> ORGANISM: Artificial Sequence
<220> FEATURE:
<223> OTHER INFORMATION: FAK1_572_581_Y577npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 146

Glu Asp Ser Thr Tyr Tyr Lys Ala Ser Lys
1               5                   10

<210> SEQ ID NO 147
<211> LENGTH: 10
<212> TYPE: PRT
<213> ORGANISM: Artificial Sequence
<220> FEATURE:
<223> OTHER INFORMATION: FAK1_572_581_Y576npY
<220> FEATURE:
```

```
<221> NAME/KEY: MOD_RES
<222> LOCATION: (5)..(5)
<223> OTHER INFORMATION: 3-NO2-phosphotyrosine

<400> SEQUENCE: 147

Glu Asp Ser Thr Tyr Tyr Lys Ala Ser Lys
1               5                   10

<210> SEQ ID NO 148
<211> LENGTH: 11
<212> TYPE: PRT
<213> ORGANISM: Artificial Sequence
<220> FEATURE:
<223> OTHER INFORMATION: CRK_216_226_Y221npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 148

Pro Glu Pro Gly Pro Tyr Ala Gln Pro Ser Val
1               5                   10

<210> SEQ ID NO 149
<211> LENGTH: 11
<212> TYPE: PRT
<213> ORGANISM: Artificial Sequence
<220> FEATURE:
<223> OTHER INFORMATION: MET_1229_1239_Y1235npY
<220> FEATURE:
<221> NAME/KEY: MOD_RES
<222> LOCATION: (7)..(7)
<223> OTHER INFORMATION: 3-NO2-phosphotyrosine

<400> SEQUENCE: 149

Asx Tyr Asp Lys Glu Tyr Tyr Ser Val His Asn
1               5                   10

<210> SEQ ID NO 150
<211> LENGTH: 11
<212> TYPE: PRT
<213> ORGANISM: Artificial Sequence
<220> FEATURE:
<223> OTHER INFORMATION: MET_1229_1239_Y1234npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 150

Asx Tyr Asp Lys Glu Tyr Tyr Ser Val His Asn
1               5                   10

<210> SEQ ID NO 151
<211> LENGTH: 10
<212> TYPE: PRT
<213> ORGANISM: Artificial Sequence
<220> FEATURE:
<223> OTHER INFORMATION: PGFRB_1016_1025_Y1021npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 151

Glu Gly Asp Asn Asp Tyr Ile Ile Pro Leu
1               5                   10

<210> SEQ ID NO 152
```

```
<211> LENGTH: 10
<212> TYPE: PRT
<213> ORGANISM: Artificial Sequence
<220> FEATURE:
<223> OTHER INFORMATION: MK12_180_189_Y185npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 152

Ser Glu Asx Thr Gly Tyr Val Val Thr Arg
1               5                   10

<210> SEQ ID NO 153
<211> LENGTH: 10
<212> TYPE: PRT
<213> ORGANISM: Artificial Sequence
<220> FEATURE:
<223> OTHER INFORMATION: MBP_198_207_Y203npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 153

Ala Arg Thr Ala His Tyr Gly Ser Leu Pro
1               5                   10

<210> SEQ ID NO 154
<211> LENGTH: 10
<212> TYPE: PRT
<213> ORGANISM: Artificial Sequence
<220> FEATURE:
<223> OTHER INFORMATION: MBP_263_272_Y268npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 154

Gly Arg Ala Ser Asp Tyr Lys Ser Ala His
1               5                   10

<210> SEQ ID NO 155
<211> LENGTH: 10
<212> TYPE: PRT
<213> ORGANISM: Artificial Sequence
<220> FEATURE:
<223> OTHER INFORMATION: CADH2_780_789_Y785npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 155

Glu Glu Asp Gln Asp Tyr Asp Leu Ser Gln
1               5                   10

<210> SEQ ID NO 156
<211> LENGTH: 10
<212> TYPE: PRT
<213> ORGANISM: Artificial Sequence
<220> FEATURE:
<223> OTHER INFORMATION: PDPK1_4_13_Y9npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 156
```

Thr Thr Ser Gln Leu Tyr Asp Ala Val Pro
1               5                   10

<210> SEQ ID NO 157
<211> LENGTH: 10
<212> TYPE: PRT
<213> ORGANISM: Artificial Sequence
<220> FEATURE:
<223> OTHER INFORMATION: ZAP70_287_296_Y292npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 157

Leu Asn Ser Asp Gly Tyr Thr Pro Glu Pro
1               5                   10

<210> SEQ ID NO 158
<211> LENGTH: 10
<212> TYPE: PRT
<213> ORGANISM: Artificial Sequence
<220> FEATURE:
<223> OTHER INFORMATION: PGFRB_746_755_Y751npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 158

Asp Glu Ser Val Asp Tyr Val Pro Asx Leu
1               5                   10

<210> SEQ ID NO 159
<211> LENGTH: 10
<212> TYPE: PRT
<213> ORGANISM: Artificial Sequence
<220> FEATURE:
<223> OTHER INFORMATION: GHR_591_600_Y595npY
<220> FEATURE:
<221> NAME/KEY: MOD_RES
<222> LOCATION: (5)..(5)
<223> OTHER INFORMATION: 3-NO2-phosphotyrosine

<400> SEQUENCE: 159

Pro Val Pro Asp Tyr Thr Ser Ile His Ile
1               5                   10

<210> SEQ ID NO 160
<211> LENGTH: 10
<212> TYPE: PRT
<213> ORGANISM: Artificial Sequence
<220> FEATURE:
<223> OTHER INFORMATION: CSK_179_188_Y184npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 160

Ala Gln Asp Glu Phe Tyr Arg Ser Gly Trp
1               5                   10

<210> SEQ ID NO 161
<211> LENGTH: 10
<212> TYPE: PRT
<213> ORGANISM: Artificial Sequence
<220> FEATURE:
<223> OTHER INFORMATION: SIGLEC2_817_826_Y822npY

```
<220> FEATURE:
<221> NAME/KEY: MOD_RES
<222> LOCATION: (6)..(6)
<223> OTHER INFORMATION: 3-NO2-phosphotyrosine

<400> SEQUENCE: 161

Asp Glu Gly Ile His Tyr Ser Glu Leu Ile
1               5                   10

<210> SEQ ID NO 162
<211> LENGTH: 9
<212> TYPE: PRT
<213> ORGANISM: Artificial Sequence
<220> FEATURE:
<223> OTHER INFORMATION: STAT3_701_709_Y705npY
<220> FEATURE:
<221> NAME/KEY: MOD_RES
<222> LOCATION: (5)..(5)
<223> OTHER INFORMATION: 3-NO2-phosphotyrosine

<400> SEQUENCE: 162

Ser Ala Ala Pro Tyr Leu Lys Thr Lys
1               5

<210> SEQ ID NO 163
<211> LENGTH: 10
<212> TYPE: PRT
<213> ORGANISM: Artificial Sequence
<220> FEATURE:
<223> OTHER INFORMATION: JAK2_1002_1011_Y1007npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 163

Pro Gln Asp Lys Glu Tyr Tyr Lys Val Lys
1               5                   10

<210> SEQ ID NO 164
<211> LENGTH: 11
<212> TYPE: PRT
<213> ORGANISM: Artificial Sequence
<220> FEATURE:
<223> OTHER INFORMATION: LCK_389_399_Y394npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 164

Ile Glu Asp Asn Glu Tyr Thr Ala Arg Glu Gly
1               5                   10

<210> SEQ ID NO 165
<211> LENGTH: 11
<212> TYPE: PRT
<213> ORGANISM: Artificial Sequence
<220> FEATURE:
<223> OTHER INFORMATION: INSR_994_1004_Y999npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 165

Ser Ser Asn Pro Glu Tyr Leu Ser Ala Ser Asp
1               5                   10
```

-continued

```
<210> SEQ ID NO 166
<211> LENGTH: 11
<212> TYPE: PRT
<213> ORGANISM: Artificial Sequence
<220> FEATURE:
<223> OTHER INFORMATION: INSR_1350_1360_Y1355npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 166

Gly Phe Lys Arg Ser Tyr Glu Glu His Ile Pro
1               5                   10

<210> SEQ ID NO 167
<211> LENGTH: 11
<212> TYPE: PRT
<213> ORGANISM: Artificial Sequence
<220> FEATURE:
<223> OTHER INFORMATION: EGFR_1192_1202_Y1197npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 167

Ala Glu Asn Ala Glu Tyr Leu Arg Val Ala Pro
1               5                   10

<210> SEQ ID NO 168
<211> LENGTH: 11
<212> TYPE: PRT
<213> ORGANISM: Artificial Sequence
<220> FEATURE:
<223> OTHER INFORMATION: EGFR_1011_1021_Y1016npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 168

Val Asp Ala Asp Glu Tyr Leu Ile Pro Gln Gln
1               5                   10

<210> SEQ ID NO 169
<211> LENGTH: 11
<212> TYPE: PRT
<213> ORGANISM: Artificial Sequence
<220> FEATURE:
<223> OTHER INFORMATION: VGFR1_1208_1218_1213npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 169

Ser Asp Asp Val Arg Tyr Val Asn Ala Phe Lys
1               5                   10

<210> SEQ ID NO 170
<211> LENGTH: 11
<212> TYPE: PRT
<213> ORGANISM: Artificial Sequence
<220> FEATURE:
<223> OTHER INFORMATION: STA5A_689_699_Y694npY
<220> FEATURE:
<221> NAME/KEY: MOD_RES
<222> LOCATION: (6)..(6)
<223> OTHER INFORMATION: 3-NO2-phosphotyrosine
```

<400> SEQUENCE: 170

Lys Ala Val Asp Gly Tyr Val Lys Pro Gln Ile
1               5                   10

<210> SEQ ID NO 171
<211> LENGTH: 11
<212> TYPE: PRT
<213> ORGANISM: Artificial Sequence
<220> FEATURE:
<223> OTHER INFORMATION: EGFR_1064_1074_Y1069npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 171

Ser Phe Leu Gln Arg Tyr Ser Ser Asp Pro Thr
1               5                   10

<210> SEQ ID NO 172
<211> LENGTH: 11
<212> TYPE: PRT
<213> ORGANISM: Artificial Sequence
<220> FEATURE:
<223> OTHER INFORMATION: ALK_1073_1083_Y1078npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 172

Leu Gln Ser Pro Glu Tyr Lys Leu Ser Lys Leu
1               5                   10

<210> SEQ ID NO 173
<211> LENGTH: 11
<212> TYPE: PRT
<213> ORGANISM: Artificial Sequence
<220> FEATURE:
<223> OTHER INFORMATION: TEC_514_524_Y519npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 173

Phe Leu Asp Asp Gln Tyr Thr Ser Ser Ser Gly
1               5                   10

<210> SEQ ID NO 174
<211> LENGTH: 11
<212> TYPE: PRT
<213> ORGANISM: Artificial Sequence
<220> FEATURE:
<223> OTHER INFORMATION: CDK2_10_20_Y15npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 174

Ile Gly Glu Gly Thr Tyr Gly Val Val Tyr Lys
1               5                   10

<210> SEQ ID NO 175
<211> LENGTH: 11
<212> TYPE: PRT
<213> ORGANISM: Artificial Sequence
<220> FEATURE:

```
<223> OTHER INFORMATION: RAF1_335_345_Y340npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 175

Gln Arg Asp Ser Ser Tyr Tyr Trp Glu Ile Glu
1               5                   10

<210> SEQ ID NO 176
<211> LENGTH: 11
<212> TYPE: PRT
<213> ORGANISM: Artificial Sequence
<220> FEATURE:
<223> OTHER INFORMATION: PECA1_708_718_Y713npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 176

Asp Thr Glu Thr Val Tyr Ser Glu Val Arg Lys
1               5                   10

<210> SEQ ID NO 177
<211> LENGTH: 11
<212> TYPE: PRT
<213> ORGANISM: Artificial Sequence
<220> FEATURE:
<223> OTHER INFORMATION: STAT1_696_706_Y701npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 177

Pro Lys Gly Thr Gly Tyr Ile Lys Thr Glu Leu
1               5                   10

<210> SEQ ID NO 178
<211> LENGTH: 11
<212> TYPE: PRT
<213> ORGANISM: Artificial Sequence
<220> FEATURE:
<223> OTHER INFORMATION: ERBB2_1243_1253_Y1248npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 178

Ala Glu Asn Pro Glu Tyr Leu Gly Leu Asp Val
1               5                   10

<210> SEQ ID NO 179
<211> LENGTH: 11
<212> TYPE: PRT
<213> ORGANISM: Artificial Sequence
<220> FEATURE:
<223> OTHER INFORMATION: PAXI_113_123_Y118npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 179

Glu Glu Glu His Val Tyr Ser Phe Pro Asn Lys
1               5                   10
```

```
<210> SEQ ID NO 180
<211> LENGTH: 10
<212> TYPE: PRT
<213> ORGANISM: Artificial Sequence
<220> FEATURE:
<223> OTHER INFORMATION: EPOR_421_430_Y426npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 180

Ala Ala Ser Phe Glu Tyr Thr Ile Leu Asp
1               5                   10

<210> SEQ ID NO 181
<211> LENGTH: 11
<212> TYPE: PRT
<213> ORGANISM: Artificial Sequence
<220> FEATURE:
<223> OTHER INFORMATION: CTNNB1_81_91_Y86npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 181

Asp Ile Asp Gly Gln Tyr Ala Asx Thr Arg Ala
1               5                   10

<210> SEQ ID NO 182
<211> LENGTH: 12
<212> TYPE: PRT
<213> ORGANISM: Artificial Sequence
<220> FEATURE:
<223> OTHER INFORMATION: ART_003_Y4pY
<220> FEATURE:
<221> NAME/KEY: MOD_RES
<222> LOCATION: (4)..(4)
<223> OTHER INFORMATION: 3-NO2-phosphotyrosine

<400> SEQUENCE: 182

Glu Ala Ile Tyr Ala Ala Pro Phe Ala Lys Lys Lys
1               5                   10

<210> SEQ ID NO 183
<211> LENGTH: 11
<212> TYPE: PRT
<213> ORGANISM: Artificial Sequence
<220> FEATURE:
<223> OTHER INFORMATION: TIE1_1002_1012_Y1007npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 183

Arg Gly Glu Glu Val Tyr Val Lys Lys Thr Asx
1               5                   10

<210> SEQ ID NO 184
<211> LENGTH: 11
<212> TYPE: PRT
<213> ORGANISM: Artificial Sequence
<220> FEATURE:
<223> OTHER INFORMATION: SELE_598_608_Y603npY
<220> FEATURE:
<221> NAME/KEY: MOD_RES
<222> LOCATION: (6)..(6)
<223> OTHER INFORMATION: 3-NO2-phosphotyrosine
```

```
<400> SEQUENCE: 184

Glu Ser Asp Gly Ser Tyr Gln Lys Pro Ser Tyr
1               5                   10

<210> SEQ ID NO 185
<211> LENGTH: 11
<212> TYPE: PRT
<213> ORGANISM: Artificial Sequence
<220> FEATURE:
<223> OTHER INFORMATION: BCR_172_182_Y177npY
<220> FEATURE:
<221> NAME/KEY: MOD_RES
<222> LOCATION: (6)..(6)
<223> OTHER INFORMATION: 3-NO2-phosphotyrosine

<400> SEQUENCE: 185

Ala Glu Lys Pro Phe Tyr Val Asn Val Glu Phe
1               5                   10

<210> SEQ ID NO 186
<211> LENGTH: 9
<212> TYPE: PRT
<213> ORGANISM: Artificial Sequence
<220> FEATURE:
<223> OTHER INFORMATION: STAT3_701_709_Y705nY
<220> FEATURE:
<221> NAME/KEY: MOD_RES
<222> LOCATION: (5)..(5)
<223> OTHER INFORMATION: 3-NO2-phosphotyrosine

<400> SEQUENCE: 186

Ser Ala Ala Pro Tyr Leu Lys Thr Lys
1               5

<210> SEQ ID NO 187
<211> LENGTH: 13
<212> TYPE: PRT
<213> ORGANISM: Artificial Sequence
<220> FEATURE:
<223> OTHER INFORMATION: ENOG_37_49

<400> SEQUENCE: 187

Ser Gly Ala Ser Thr Gly Ile Tyr Glu Ala Leu Glu Leu
1               5                   10

<210> SEQ ID NO 188
<211> LENGTH: 13
<212> TYPE: PRT
<213> ORGANISM: Artificial Sequence
<220> FEATURE:
<223> OTHER INFORMATION: SRC8_CHICK_476_488

<400> SEQUENCE: 188

Glu Tyr Glu Pro Glu Thr Val Tyr Glu Val Ala Gly Ala
1               5                   10

<210> SEQ ID NO 189
<211> LENGTH: 13
<212> TYPE: PRT
<213> ORGANISM: Artificial Sequence
<220> FEATURE:
<223> OTHER INFORMATION: SRC8_CHICK_492_504

<400> SEQUENCE: 189

Tyr Gln Ala Glu Glu Asn Thr Tyr Asp Glu Tyr Glu Asn
1               5                   10
```

METHOD FOR PREDICTING THE RESPONSE OF MELANOMA PATIENTS TO A MEDICAMENT

CROSS-REFERENCE TO RELATED APPLICATIONS

This application is a U.S. national stage entry under 35 U.S.C. § 371 of PCT International Patent Application No. PCT/EP2017/057643, filed Mar. 31, 2017, which claims priority to European Patent Application No. 16163336.7, filed Mar. 31, 2016, the contents of which are incorporated herein by reference in their entirety.

FIELD OF THE INVENTION

The present invention relates to a methods and devices for determining or predicting the response of a patient diagnosed with melanoma to specific medicaments. More specifically, the present invention provides methods which measure kinase and/or phosphatase activity by studying phosphorylation levels and profiles in samples, preferably blood samples, of said patients.

BACKGROUND OF THE INVENTION

Melanoma is a cancer that begins in the melanocytes. Melanocytes, the cells that can become melanoma, are also found in the epidermis. These skin cells make a brown pigment called melanin, which gives the skin its tan or brown colour. Melanin protects the deeper layers of the skin from some of the harmful effects of the sun. For most people, when skin is exposed to the sun, melanocytes make more of the pigment, causing the skin to tan or darken. Melanoma accounts for less than 2% of skin cancer cases but causes a large majority of skin cancer deaths. Melanoma is a cancer that begins in the melanocytes.

Melanoma remains a highly morbid disease and its incidence has continued to rise sharply over the past few decades. Overall incidence rates for melanoma are increasing among men and women. Since 1981, the rate of increase has been about 3% per year. According to estimates from the American Cancer Society, there were about 59,580 new cases of melanoma in the U.S. in 2005, and about 7,700 people died of this disease. Prior to 2009 the only FDA approved treatments for metastatic melanoma included dacarbazine, interferon-alpha, and interleukin-2. However, the prognosis of patients with disseminated disease remained poor, with a 5-year survival rate of 16% or less in the U.S. New treatments such as anti-angiogenic agents, Raf, Mek and other kinase inhibitors and vaccines are currently being developed and may offer improvements in survival for patients with this disease. In addition, the toll of melanoma in terms of "life-years lost" is the highest of all solid tumours in the United States.

For the diagnosis of melanoma a surface skin biopsy, punch biopsy or excisional biopsy is taken. Based on a primary biopsy diagnosis nearby lymph nodes may be biopsied to see if the cancer has spread. Staging of melanoma is based on the American Joint Committee on Cancer (AJCC) TNM system. The T stands for tumour (how far it has grown within the skin and other factors). The T category is assigned a number (from 0 to 4) based on the tumour's thickness (how far down it has grown). N stands for spread to nearby lymph nodes (bean-sized collections of immune system cells, to which cancers often spread first). The N category is assigned a number (from 0 to 3) based on whether the melanoma cells have spread to lymph nodes or are found in the lymphatic channels connecting the lymph nodes. The M category is based on whether the melanoma has metastasized (spread) to distant organs, which organs it has reached. According to these standards the different stages and survival in the US are as follows:

Stage IA: The 5-year survival rate is around 97%. The 10-year survival is around 95%.
Stage IB: The 5-year survival rate is around 92%. The 10-year survival is around 86%.
Stage IIA: The 5-year survival rate is around 81%. The 10-year survival is around 67%.
Stage IIB: The 5-year survival rate is around 70%. The 10-year survival is around 57%.
Stage IIC: The 5-year survival rate is around 53%. The 10-year survival is around 40%.
Stage IIIA: The 5-year survival rate is around 78%. The 10-year survival is around 68%.
Stage IIIB: The 5-year survival rate is around 59%. The 10-year survival is around 43%.
Stage IIIC: The 5-year survival rate is around 40%. The 10-year survival is around 24%.
Stage IV: The 5-year survival rate is about 15%-20%. The 10-year survival is about 10%-15%.

Melanoma treatment options are based on the stage of the disease and may include: surgery, chemotherapy, targeted therapy, immunotherapy and radiation therapy. Early-stage melanomas can often be cured with surgery alone, but more advanced melanomas can be much harder to treat because standard cancer treatments such as chemotherapy are not very effective. But in recent years, newer types of immunotherapy and targeted therapies have changed the treatment of this disease, and many new treatments have shown a great deal of promise in treating advanced melanomas.

Current immunotherapy approaches for melanoma fall into six main categories: checkpoint inhibitors, oncolytic virus therapies, cancer vaccines, adoptive T cell therapy, monoclonal antibodies, and cytokines. Immune checkpoint inhibitors have been successfully used to treat melanoma. This therapy is based upon the fact that T lymphocytes are critical to antitumor immunity, and this antitumor immunity requires activation by an antigen-specific T cell receptor in the context of costimulatory activation. Excess immune activation is being prevented by a naturally occurring feedback mechanism that leads to the expression of negative costimulatory molecules ("checkpoints"). Examples of such checkpoints are cytotoxic T-lymphocyte antigen 4 (CTLA-4), programmed death 1 (PD-1), T cell immunoglobulin 3, and lymphocyte-activation gene 3. Antibodies directed against these checkpoints may restore or augment an antitumor immune response and produce tumor responses in patients with advanced melanoma. Examples of such antibodies are Ipilimumab (CTLA-4 inhibition), Nivolumab (PD-1 inhibition) and Pembrolizumab (PD-L1 inhibition).

In particular, stage IV melanomas are very hard to cure, as they have already spread to distant lymph nodes or other areas of the body. While the skin tumours can often be removed by surgery or treated with radiation therapy, metastases in internal organs which cannot be removed may be treated with radiation, immunotherapy, targeted therapy, or chemotherapy. Checkpoint inhibitors can be used alone or in combination. Though, not all patients respond to these therapies. Approximately 30% of the patients treated with a checkpoint inhibitor respond to this drug. For combinatorial treatment with checkpoint blockers, approximately 60% of the patients show a positive response.

Unfortunately, most anti-tumour treatments are associated with undesirable side effects, such as profound nausea, vomiting, or severe fatigue. Also, while anti-tumour treatments have been successful, they do not produce significant clinical responses in all patients who receive them resulting in undesirable side effects, delays, and costs associated with ineffective treatment. Therefore, biomarkers that can be used to predict the response of a subject to an antitumor agent prior to administration thereof are greatly needed.

Given the high incidence of melanoma and limited efficacy of current treatments, a melanoma biomarker and assay for a melanoma biomarker is needed.

Also, assays for melanoma biomarkers as an accurate early indicator for therapeutic response typically require taking a surface skin biopsy, punch biopsy or excisional biopsy which are considered unpleasant for the patient and can result in the formation of scar tissue.

In view of the above, there remains a pressing need for improved methods that provide a fast and accurate prediction of the response of a patient diagnosed with melanoma to targeted pharmacotherapy.

SUMMARY OF THE INVENTION

Drug response between individuals differs. Drugs can work more or less efficient; but can also induce adverse drug reactions, toxicity and side effects.

The present invention provides methods and devices that enable the determination of the response of a patient diagnosed with melanoma to targeted pharmacotherapy by measuring kinase and/or phosphatase activity of a sample from said patient. The response of the patient can be determined by adverse drug reactions, toxicity and/or side effects.

The present invention further provides in a method for predicting the response of a patient diagnosed with melanoma cancer, to a medicament, comprising the steps of:

(a) measuring the kinase and/or phosphatase activity of a sample, obtained from said patient diagnosed with melanoma, by contacting said sample with at least one protein kinase substrate and/or at least one protein phosphatase substrate, thereby providing a phosphorylation profile of said sample, said phosphorylation profile comprising the phosphorylation levels of phosphorylation sites present in at least 10 peptide markers as listed in Table 1 and/or Table 3, and/or in at least 10 peptide markers as listed Table 2; and, (b) determining from said phosphorylation profile the response of said patient to said medicament.

The method according to the invention provides that said sample is obtained from a blood sample of said patient diagnosed with melanoma.

The method according to the invention further provides that said blood sample comprises peripheral blood mononuclear cells.

The method according to the invention further provides that said medicament is chosen from the list comprising Ipilimumab, Nivolumab, Prembrolizumab, Pidilizumab, BMS-936559, Atezolizumab and/or analogs thereof and/or a combination thereof.

The method according to the invention further provides that said phosphorylation profiles comprise the phosphorylation levels of phosphorylation sites present in at least 30 of the peptide markers as listed in Table 1 and/or Table 3, and/or in at least 30 of the peptide markers as listed in Table 2.

The method according to the invention further provides that said phosphorylation profiles comprise the phosphorylation levels of phosphorylation sites present in the peptide markers as listed in Table 1, Table 3 and/or Table 2.

The method according to the invention further provides that step (b) is replaced by a step (c) calculating a classifier parameter from said phosphorylation profile; and a step (d) determining the response of said patient to said medicament on the basis of said classifier parameter.

The method according to the invention further provides that said classifier parameter indicates said patient being a good responder to said medicament if said classifier parameter is above a first predetermined threshold level, and wherein said classifier parameter indicates said patient being a poor responder to said medicament if said classifier parameter is below a second predetermined threshold level.

The method according to the invention further provides that step (b) is replaced by a step (e) comparing said phosphorylation profile to a first and a second reference phosphorylation profile; said first reference phosphorylation profile being representative for a good responder to said medicament and said second reference phosphorylation profile being representative for a poor responder to said medicament; and a step (f) determining response of said patient to said medicament on the basis of the comparison of said phosphorylation profile with said first and said second reference phosphorylation profile.

The method according to the invention further provides that said phosphorylation profile or said classifier parameter indicates good response, poor response or undetermined response of said patient to said medicament.

The method according to the invention further provides that said melanoma is an irresectable stage IIIc or IV melanoma.

The method according to the invention further provides that from the measurements in step (a) the toxicity of said medicament in said patient is determined. Adverse toxicological effects of medicaments are related to the physicochemical characteristics of a compound and its effects on cellular organelles, membranes, metabolic and on-target or off-target cell signaling pathways. Off-target refers to adverse effects as a result of modulation of other targets; these may be related biologically or totally unrelated to the target of interest. It is imperative that the toxicological pathologist use the toxicological and biologic and patient derived data such as cell signaling data of patient derived materials to test whether toxicity is chemical-based and induces off-target effects. Studying off-target-based effects are important as an aid in individualized human risk assessment of medicaments.

In a second aspect the present invention provides in a method for diagnosing melanoma for a patient, wherein the kinase and/or phosphatase activity of a sample, obtained from said patient, is measured, wherein said kinase and/or phosphatase activity measurement provides phosphorylation profiles of said sample thereby diagnosing melanoma for said patient.

The method according to the invention further provides that said phosphorylation profiles comprise the phosphorylation levels of phosphorylation sites present in at least 10 peptide markers as listed in Table 1 and/or Table 3, and/or at least 10 peptide markers as listed in Table 2.

In a third aspect the present invention provides in a computer program product for use in conjunction with a computer having a processor and a memory connected to the processor, said computer program product comprising a computer readable storage medium having a computer program mechanism encoded thereon, wherein said computer program mechanism may be loaded into the memory of said computer and cause said computer to carry out the method according to the invention.

These and further aspects and embodiments are described in the following sections and in the claims.

DETAILED DESCRIPTION OF THE INVENTION

Figure 1:
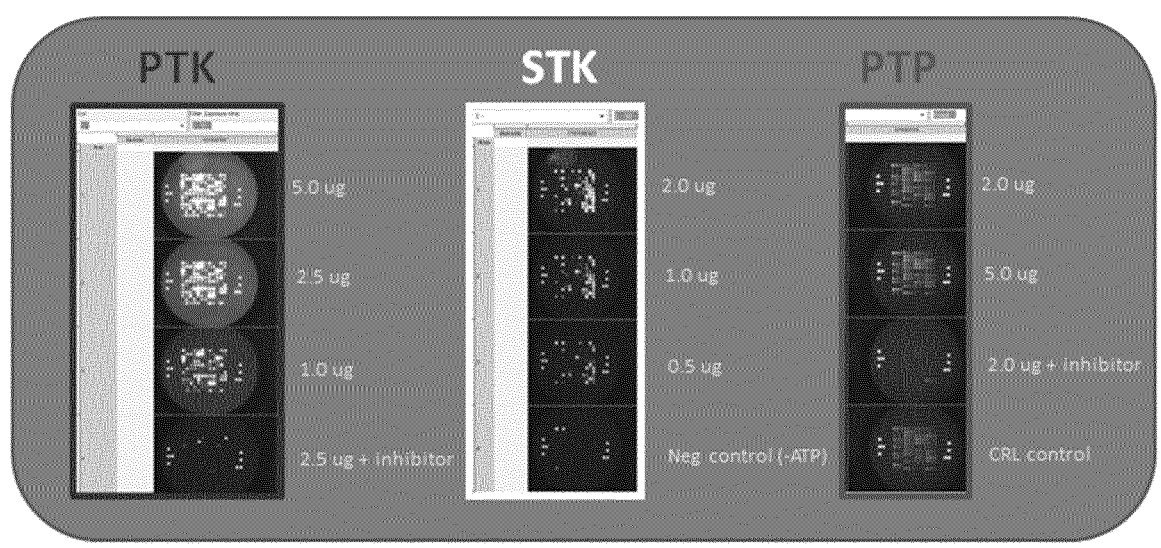
FIG. 1 shows that patient-derived blood profiling based on protein tyrosine kinase (PTK), serine/threonine protein kinase (STK/TTK) and protein tyrosine phosphatase (PTP) assays is sensitive and provides high signals for only 1-2 µg of protein in all assays.

Before the present method and devices used in the invention are described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may be used in the practice or testing of the present invention, the preferred methods and materials are now described.

In this specification and the appended claims, the singular forms "a", "an", and "the" include plural references unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The terms "comprising", "comprises" and "comprised of" also include the term "consisting of".

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

The present invention provides methods and devices that enable the determination of the response of a patient diagnosed with melanoma to targeted pharmacotherapy by measuring kinase activity and/or phosphatase activity of a sample, preferably a blood sample, obtained from said patient diagnosed with melanoma. The present invention further shows how the method and devices can be used to predict the response of patients diagnosed with melanoma to a specific medicament. The method of the present invention therefore adds to the existing assays currently used to select therapies in melanoma patients.

In one embodiment of the present invention, methods are provided wherein the response of a patient diagnosed with melanoma to targeted pharmacotherapy is determined by measuring the kinase activity, preferably the protein kinase activity. For purposes of the present invention, and as used herein the term "kinase activity" or "protein kinase activity" refer to the formation of reaction product(s) by a certain amount of kinase or protein kinase acting on a substrate during the course of the assay.

Protein kinase activity is referred to as the activity of protein kinases. A protein kinase is a generic name for all enzymes that transfer a phosphate to a protein. About two percent of the human genome contains transcription information for the formation of protein kinases. Currently, there are about 518 known different protein kinases. However, because three to four percent of the human genome is a code for the formation of protein kinases, there may be many more separate kinases in the human body.

Phosphatase activity is referred to as the activity of protein phosphatases. A phosphatase is a generic name for all enzymes able to remove a phosphate group from a substrate by hydrolysing phosphoric acid monoesters into a phosphate ion and a molecule with a free hydroxyl group. This action is directly opposite to that of phosphorylases and kinases, which attach phosphate groups to their substrates by using energetic molecules like ATP. Protein phosphatases (PPs) are the primary effectors of dephosphorylation and can be grouped into three main classes based on sequence, structure and catalytic function. The largest class of PPs is the phosphoprotein phosphatase (PPP) family comprising PP1, PP2A, PP2B, PP4, PP5, PP6 and PP7, and the protein phosphatase $Mg^{2+}$- or $Mn^{2+}$-dependent (PPM) family, composed primarily of PP2C. The protein Tyrosine phosphatase (PTP) super-family forms the second group, and the aspartate-based protein phosphatases the third.

A protein kinase is a kinase enzyme that modifies other proteins by covalently coupling phosphate groups to them. This process or activity is also referred to as phosphorylation. Phosphorylation can therefore be regarded as the process of the addition of a phosphate group to a substrate. Phosphorylation usually results in a functional change of the substrate by changing kinase activity, cellular location, or association with other proteins. Up to 30 percent of all proteins may be modified by kinase activity, and kinases are known to regulate the majority of cellular pathways, especially those involved in signal transduction, the transmission of signals within the cell. The chemical activity of a kinase involves removing a phosphate group from ATP or GTP and covalently attaching it to amino acids such as serine, threonine, tyrosine, histidine, aspartic acid and/or glutamic acid that have a free hydroxyl group. Most known kinases act on both serine and threonine, others act on tyrosine, and a number act on all serine, threonine and tyrosine. The protein kinase activity monitored with the method of the present invention is preferably directed to protein kinases acting towards serine, threonine and/or tyrosine, preferably acting on both serine and threonine, on tyrosine or on serine, threonine and tyrosine and more preferably the method of the present invention if preferably directed to protein kinases acting towards serine and threonine.

In another embodiment of the present invention, methods are provided wherein the response of a patient diagnosed with melanoma to targeted pharmacotherapy is determined by measuring the phosphatase activity, preferably the protein phosphatase activity. For purposes of the present invention, and as used herein the term "phosphatase activity" or "protein phosphatase activity" refer to the formation of reaction product(s) by a certain amount of phosphatase or protein phosphatase acting on a substrate during the course of the assay.

A protein phosphatase is a phosphatase enzyme that modifies other proteins by enzymatically removing phosphate groups from them. This process or activity is also referred to as dephosphorylation. Dephosphorylation can therefore be regarded as the process of the removing a phosphate group from a substrate. Dephosphorylation usually results in a functional change of the substrate by changing phosphatase activity, cellular location, or association with other proteins. Up to 30% of all proteins may be modified by phosphatase activity, and phosphatases are known to regulate the majority of cellular pathways, especially those involved in signal transduction, the transmission of signals within the cell. The activity of a phosphatase involves removing a phosphate group from amino acids such as serine, threonine, tyrosine, histidine, aspartic acid and/or glutamic acid that have a free hydroxyl group. Most known phosphatases act on both serine and threonine, others act on tyrosine, and a number act on all serine, threonine and tyrosine. The protein phosphatase activity that can be monitored with the tools provided by the present invention is preferably directed to protein phosphatases acting towards tyrosines.

Protein kinases are distinguished by their ability to phosphorylate substrates on discrete sequences. These sequences have been determined by sequencing the amino acids around the phosphorylation sites and are usually distinct for each protein kinase. The recognition sequence on each substrate is specific for each kinase catalyst.

Protein phosphatases are distinguished by their ability to dephosphorylate substrates on discrete sequences. These sequences can be determined by sequencing the amino acids around the dephosphorylation sites and are usually distinct for each type of protein phosphatase.

In another embodiment of the present invention, methods are provided wherein the response of a patient diagnosed with melanoma to targeted pharmacotherapy is determined by measuring both kinase and phosphatase activity, preferably protein kinase and protein phosphatase activity. Because protein kinases and protein phosphatases have profound effects on a cell, their activity is highly regulated. Kinases and phosphatases are turned on or off by for instance phosphorylation, by binding of activator proteins or inhibitor proteins, or small molecules, or by controlling their location in the cell relative to their substrates. Deregulated kinase and/or phosphatase activity is a frequent cause of disease, particularly cancer, where kinases regulate many aspects that control cell growth, movement and death. Therefore monitoring the protein kinase and/or protein phosphatase activity in tissues can be of great importance and a large amount of information can be obtained when comparing the kinase and/or phosphatase activity of different tissue samples.

As described in the present invention, the inventors have surprisingly found that the response of a patient diagnosed with melanoma to targeted pharmacotherapy can be predicted and/or determined on the basis of the measurement of the kinase and/or phosphatase activity, preferably protein kinase and/or protein phosphatase activity, of a sample taken from said patient diagnosed with melanoma. The methods according to present invention enable to provide information regarding the efficacy of the targeted pharmacotherapy treatment, and more specifically provide an early determination of the most suited treatment of the melanoma patient.

The measurement of the kinase and/or phosphatase activity is performed by contacting a sample from a patient diagnosed melanoma with one or more kinase and/or phosphatase substrates, preferably protein kinase and/or protein phosphatase substrates, thereby generating one or more phosphorylation profile(s).

Said protein kinase and/or protein phosphatase substrates as used herein, are preferably peptides, proteins or peptide mimetics. The protein kinase substrates each comprise, preferably one or more, phosphorylation sites that can be phosphorylated by the protein kinases or dephosphorylated by the protein phosphatases present in the sample. Therefore, exposure of a protein kinase substrate to a sample comprising a protein kinase results in the phosphorylation of one or more of the phosphorylation sites of the protein kinase substrate. Alternatively, exposure of a protein phosphatase substrate to a sample comprising a protein phosphatase results in the dephosphorylation of one or more of the phosphorylation sites of the protein phosphatase substrate. This phosphorylation and/or dephosphorylation activity can be measured using techniques known in the art. Therefore, during the measurement method the kinase enzymes present in the sample will phosphorylate, preferably one or more, of the phosphorylation sites on one or more protein kinase substrate and/or the phosphatase enzymes present in the sample will dephosphorylate, preferably one or more, of the phosphorylation sites on one or more protein phosphatase substrate. The inventors have observed essential differences between kinase and/or phosphatase activity of melanoma tumours having a different response to targeted pharmacotherapy. Consequently, the inventors have observed that the kinases and/or phosphatases present in a sample from patients suffering from melanoma will phosphorylate protein kinase substrates and/ or dephosphorylate protein phosphatase substrates differently depending on the response to targeted pharmacotherapy with which the patient is envisaged to be treated or is being treated. Phosphorylation signals differ between the samples, resulting in phosphorylation patterns that differ depending on response to targeted pharmacotherapy. Combining the phosphorylation profiles based on kinase and phosphatase activity provides an even more accurate prediction to the response to targeted pharmacotherapy.

For purposes of the present invention, and as used herein the term "pharmacotherapy", or "pharmacotherapeutics" or "drug treatment" refers to the use of a pharmaceutical drug, also referred to as medicine or medicament wherein said pharmacotherapy is intended for use in the diagnosis, cure, mitigation, treatment, or prevention of disease.

The present invention therefore provides in a method for predicting the response of a patient diagnosed with melanoma cancer, to a medicament, comprising the steps of:
(a) measuring the kinase of a sample, obtained from said patient diagnosed with melanoma, by contacting said sample with at least one protein kinase substrate, thereby providing a phosphorylation profile of said sample, said phosphorylation profile comprising the phosphorylation levels of phosphorylation sites present in at least 10 peptide markers as listed in Table 1 and/or Table 3; and,
(b) determining from said phosphorylation profile the response of said patient to said medicament.

In a further embodiment, the present invention therefore provides in a method for predicting the response of a patient diagnosed with melanoma cancer, to a medicament, comprising the steps of:
(a) measuring the phosphatase activity of a sample, obtained from said patient diagnosed with melanoma, by contacting said sample with at least one protein phosphatase substrate, thereby providing a phosphorylation profile of said sample, said phosphorylation profile comprising the phosphorylation levels of phosphorylation sites present in at least 10 peptide markers as listed Table 2; and,
(b) determining from said phosphorylation profile the response of said patient to said medicament.

In a preferred embodiment, the present invention therefore provides in a method for predicting the response of a patient diagnosed with melanoma cancer, to a medicament, comprising the steps of:
(a) measuring the kinase and phosphatase activity of a sample, obtained from said patient diagnosed with melanoma, by contacting said sample with at least one protein kinase substrate and at least one protein phosphatase substrate, thereby providing two phosphorylation profiles of said sample, said phosphorylation profiles comprising the phosphorylation levels of phosphorylation sites present in at least 10 peptide markers as listed in Table 1 and/or Table 3, and in at least 10 peptide markers as listed Table 2; and,
(b) determining from said phosphorylation profiles the response of said patient to said medicament.

In said preferred embodiment of present invention, a single sample obtained from a patient diagnosed with melanoma cancer is split into a first part that is used for the measurement of the kinase activity of said sample while a second part of the sample is used for the measurement of the phosphatase activity of said sample. These measurements provide two individual phosphorylation profiles of said sample: one comprising the phosphorylation levels of phosphorylation sites present in at least 10 peptide markers as listed in Table 1 and/or Table 3, and another comprising the phosphorylation levels of phosphorylation sites present in at least 10 peptide markers as listed in Table 2. The combination of these two different phosphorylation profiles improves the determination of the response of said patient to a medicament compared to the use of only one phosphorylation profile.

It is clear that effects of a medicament can be monitored using the method according to the invention as described herein. The medicament affects the degree of inhibition, the potency and/or the selectivity of the kinases and/or phosphatases in the sample. More peptide inhibition is caused by the larger effect of the medicament on the kinases and/or phosphatases in the sample and therefore the drug is less selective. Also an increased peptide inhibition would lead to a larger amount of normal tissues being affected by the drug, making the drug less tumour tissue specific.

As referred to in the present application melanoma regards a specific type of skin cancer which forms from melanocytes (pigment-containing cells in the skin). While other types of skin cancer (e.g. basal cell cancer (BCC) and squamous cell cancer (SCC)) are more common, melanoma is considered to be much more dangerous if it is not found in the early stages. It causes the majority (75%) of deaths related to skin cancer. Globally, in 2012, melanoma occurred in 232,000 people and resulted in 55,000 deaths.

As used in the present invention, the term "sample" refers to a sample obtained from an organism (patient) such as human or from components (e.g. tissue or cells) of such an organism. Blood is considered a specialized form of connective tissue. Therefore, the sample can also be a blood sample. Surface skin biopsies, punch biopsies or excisional biopsies are considered unpleasant for the patient and can result in the formation of scar tissue. Therefore, other samples than melanoma tumour tissue samples are preferred. In the present invention, said sample is preferably obtained from a patient diagnosed with melanoma and is preferably derived from the blood of said patient. More preferably, said blood sample comprises pheripheral blood monocytes (PBMCs).

Said sample is preferably a fresh or a fresh frozen sample. More preferably, said sample refers to a lysate of blood-derived PBMCs, which are preferably isolated by Ficoll-Isopaque density centrifugation or by any methods known in the art.

Alternatively said sample may be derived from a melanoma tumour sample tissue or a metastasis thereof. Said sample may be obtained from a melanoma tumour sample tissue or a metastasis thereof that has been cultured in vitro for a limited period of time. Said sample may be obtained from specific melanoma cell lines and in particular cell lysates thereof.

In a preferred embodiment of the present invention said sample is a sample that has undergone a preparation step prior to the steps according to the method of the present invention. Preferably said preparation step is a step where the protein kinases and/or protein phosphatases present in said sample are released from the tissue by lysis. Additionally the kinases and/or phosphatases in the sample may be stabilized, maintained, enriched or isolated, and the measurement of the kinase and/or phosphatase activity as performed in step (a) occurs on the enriched or isolated protein kinase and/or protein phosphatase sample. By first enriching protein kinases and/or protein phosphatases in the sample or isolating protein kinases and/or protein phosphatases from the sample the subsequent measurement of the kinase and/or phosphatase activity will occur in a more efficient and reliable manner. Also the clarity and intensity of the obtained phosphorylation signal will be increased as certain contaminants are being removed during the enriching or isolating step.

As used in the present invention, the term "phosphorylation profile" refers to a data set representative for the phosphorylation levels of, preferably one or more, phosphorylation sites present on the protein kinase and/or protein phosphatase substrates. When measuring the kinase and/or phosphatase activity of a sample by contacting said sample with protein kinase and/or protein phosphatase substrates a specific phosphorylation profile is obtained. The phosphorylation profile is generated by the phosphorylation of the protein kinase and/or protein phosphatase substrates with the protein kinases and/or protein phosphatases present in the sample and it comprises the level of phosphorylation of the phosphorylation sites present on the protein kinase and/or protein phosphatase substrates used. A phosphorylation profile can thus be generated when using at least one protein kinase and/or at least one protein phosphatase substrate in different test conditions such as for example by comparing the phosphorylation of a sample on one peptide or protein (protein kinase and/or phosphatase substrate) in the presence and absence of a phosphatase modulating compound or medicament. More frequently phosphorylation profiles of a sample will be measured using several protein kinase and/or protein phosphatase substrates in the same or sequentially carried out experiments. Preferably, the present invention determines tyrosine, serine and threonine kinase and/or tyrosine phosphatase activity levels or profiles.

It should be noted that a person skilled in the art will appreciate that the methods of the present invention can use phosphorylation profiles as a basis for determining the predicting the response to a medicament of a patient suffering from melanoma. However, the phosphorylation levels of individual protein kinase and/or phosphatase substrates can also be used as a basis for determining or predicting the response to a medicament of a patient suffering from melanoma.

It should be noted that for the measurement of the protein kinase activity, ATP or any other phosphate source needs to be added to the sample when it is contacted with the protein kinase substrates. The presence of ATP will lead to a phosphorylation of the protein kinase substrates. Alternatively, the phosphorylation of the protein kinase substrates can be performed in the absence of exogenous ATP. When no ATP is added during the incubation of the sample with the protein kinase substrates, the endogenous ATP, the ATP naturally present in the sample, will act as the primary source of ATP.

The phosphorylation level of each of the protein kinase substrates can be monitored using any method known in the art. The response of the protein kinase substrates is determined using a detectable signal, said signal resulting from the interaction of the sample with the protein kinase substrates or by for instance measuring mass differences using mass spectrometry. In determining the interaction of the sample with the protein kinase substrates the signal is the result of the interaction of the phosphorylated substrates with a molecule capable of binding to the phosphorylated substrates. This binding can be detected by e.g. surface plasmon resonance or by the molecule being detectably labelled. For the latter, the molecule that specifically binds to the substrates of interest (e.g. antibody or polynucleotide probe) can be detectably labelled by virtue of containing an atom (e.g. radionuclide), molecule (e.g. fluorescein), or enzyme or particle or complex that, due to a physical or chemical property, indicates the presence of the molecule. A molecule may also be detectably labelled when it is covalently bound to or otherwise associated with a "reporter" molecule (e.g. a biomolecule such as an enzyme) that acts on a substrate to produce a detectable atom, molecule or other complex.

The phosphorylation level of each of the protein phosphatase substrates can be monitored using typical methods known in the art. The dephosphorylation of the protein phosphatase substrates, provided with the tyrosine residues, result in a detectable signal. This signal can be either attributed to a reaction of the substrates with antibodies, but also other measurement methods are available such as for instance measuring mass differences using mass spectrometry or the direct measurement of the dephosphorylation since the product of the reaction contains a nitrophenol moiety which absorbs at 405 nm.

In determining the interaction of the sample with the protein phosphatase substrates, the signal is the result of the interaction of the substrates with a detectably labelled molecule capable of binding to the substrates subjected to the dephosphorylation. For the latter, the molecule that specifically binds to the substrates of interest (e.g., antibody) can be detectably labelled by virtue of containing an atom (e.g., radionuclide), molecule (e.g., fluorescein), or enzyme or particle or complex that, due to a physical or chemical property, indicates the presence of the molecule. A molecule may also be detectably labelled when it is covalently bound to or otherwise associated with a "reporter" molecule (e.g., a biomolecule such as an enzyme) that acts on a substrate to produce a detectable atom, molecule or other complex.

Detectable labels suitable for use in the present invention include any composition detectable by spectroscopic, photochemical, biochemical, immunochemical, electrical, optical or chemical means. Labels useful in the present invention include biotin for staining with labelled avidin or streptavidin conjugate, magnetic beads (e.g. Dynabeads'), fluorescent dyes (e.g. fluorescein, fluorescein-isothiocyanate (FITC), Texas red, rhodamine, green fluorescent protein, enhanced green fluorescent protein and related proteins with other fluorescence emission wavelengths, lissamine, phycoerythrin, Cy2, Cy3, Cy3.5, Cy5, Cy5.5, Cy7, FluorX [Amersham], SYBR Green I & II [Molecular Probes], and the like), radiolabels (e.g. 3H, 125I, 35S, 14C, or 32P), enzymes (e.g. luciferases, hydrolases, particularly phosphatases such as alkaline phosphatase, esterases and glycosidases, or oxidoreductases, particularly peroxidases such as horse radish peroxidase, and the like), substrates, cofactors, chemilluminescent groups, chromogenic agents, and colorimetric labels such as colloidal gold or coloured glass or plastic (e. g. polystyrene, polypropylene, latex, etc.), protein particles or beads. In particular, all detectable labels well known to those skilled in the art may be used as detectable labels for use in the present invention.

Means of detecting such labels are well known to those of skill in the art. Thus, for example, chemiluminescent and radioactive labels may be detected using photographic film or scintillation counters, and fluorescent markers may be detected using a photodetector to detect emitted light (e.g. as in fluorescence-activated cell sorting). Enzymatic labels are typically detected by providing the enzyme with a substrate and detecting a coloured reaction product produced by the action of the enzyme on the substrate. Colorimetric labels are detected by simply visualizing the coloured label. Thus, for example, where the label is a radioactive label, means for detection include a scintillation counter, photographic film as in autoradiography, or storage phosphor imaging. Where the label is a fluorescent label, it may be detected by exciting the fluorochrome with the appropriate wavelength of light and detecting the resulting fluorescence. The fluorescence may be detected visually, by means of photographic film, by the use of electronic detectors such as charge coupled devices (CCDs) or photomultipliers and the like. Similarly, enzymatic labels may be detected by providing the appropriate substrates for the enzyme and detecting the resulting reaction product. Also, simple colorimetric labels may be detected by observing the colour associated with the label. Fluorescence resonance energy transfer has been adapted to detect binding of unlabeled ligands, which may be useful on arrays.

In a particular embodiment of the present invention the response of the protein kinase and/or protein phosphatase substrates to the sample is determined using detectably labelled antibodies; more in particular fluorescently labelled antibodies. In those embodiments of the invention where the substrates consist of protein kinase substrates, the response of the protein kinase substrates is determined using fluorescently labelled anti-phosphotyrosine antibodies, fluorescently labelled anti-phosphoserine or fluorescently labelled anti-phosphothreonine antibodies. The use of fluorescently labelled anti-phosphotyrosine antibodies or fluorescently labelled anti-phosphoserine or fluorescently labelled anti-phosphothreonine antibodies in the method of the present invention, allows real-time or semi real-time determination of the protein kinase activity and accordingly provides the possibility to express the protein kinase activity as the initial velocity of protein kinase derived from the activity over a certain period of incubation of the sample on the substrates. In those embodiments of the invention where the substrates consist of protein phosphatase substrates, the response of the protein phosphatase substrates is determined using fluorescently labelled anti-nitrotyrosine antibodies as described in EP application 15168371.1 (which is enclosed herein by reference). The use of fluorescently labelled anti-nitrotyrosine antibodies in the method of the present invention, allows real-time or semi real-time determination of the phosphatase activity and accordingly provides the possibility to express the phosphatase activity as the initial velocity of phosphatase derived from the activity over a certain period of incubation of the sample on the substrates.

Moreover, the measurement of the kinase and/or phosphatase activity of said sample preferably occurs by contacting said sample with at least 10 the peptide markers as listed in Table 1 and/or Table 3, and/or in at least 10 peptide markers as listed Table 2.

In another embodiment according to the present invention, the phosphorylation profiles comprise the phosphorylation levels of phosphorylation sites present in at least 10 of the peptide markers as listed in Table 1 and/or Table 3, and/or at least 10 of the peptide markers Table 2. Preferably phosphorylation levels will be studied of phosphorylation sites present in at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140 or 141 of the peptide markers listed in Table 1 and/or Table 3, and/or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47 or 48 of the peptide markers listed in Table 2.

In another embodiment according to the present invention, the phosphorylation profiles comprise the phosphorylation levels of phosphorylation sites present in the peptide markers as listed in Table 1, Table 3 and/or Table 2.

The term "peptide markers" in the context of the present invention refers to the fact that the peptides as listed in Table 1, Table 3 and/or Table 2 can be preferably used according to the methods of the present invention to measure the phosphorylation levels of phosphorylation sites of said markers in samples. The phosphorylation levels of the individual phosphorylation sites present in said markers may be measured and compared in different ways. Therefore the present invention is not limited to the use of peptides identical to any of these peptide markers as listed in Table 1, Table 3 and/or Table 2 as such. The skilled person may easily on the basis of the peptide markers listed in Table 1, Table 3 and/or Table 2 design variant peptides compared to the specific peptides in said Tables and use such variant peptides in a method for measuring phosphorylation levels of phosphorylation sites common to said peptide markers as listed in Table 1, Table 3 and/or Table 2. These variant peptides may have one or more (2, 3, 4, 5, 6, 7, etc.) amino acids more or less than the given peptides and may also have amino acid substitutions (preferably conservative amino acid substitutions) as long as these variant peptides retain at least one or more of the phosphorylation sites of said original peptides as listed in said tables. Further the skilled person may also easily carry out the methods according to the present invention by using proteins (full length or N- or C-terminally truncated) comprising the amino acid regions of the "peptide markers" listed in Table 1, Table 3 and/or Table 2 as sources for studying the phosphorylation of sites present in the amino acid regions of the peptides listed in Table 1, Table 3 and/or Table 2. Also the skilled person may use peptide mimetics.

The protein kinase and/or protein phosphatase substrates as used in the methods described herein, are meant to include peptides, proteins or peptide mimetics comprising, preferably one or more, of the phosphorylation sites of the peptide markers of Table 1, Table 3 and/or Table 2. Said one or more phosphorylation sites are specifically phosphorylated by the protein kinases and/or protein phosphatases present in the sample thereby providing a phosphorylation profile. More preferably the protein kinase and/or protein phosphatase substrates (peptides, proteins or peptide mimetics) as used in the method of the present invention comprise at least 10 peptide markers as listed Table 1 and/or Table 3, and/or at least 10 peptide markers as listed in Table 2, respectively. More particularly said protein kinase substrates represent the one or more phosphorylation sites present in at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140 or 141 of the peptide markers listed in Table 1 and/or Table 3, and/or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47 or 48 of the peptide markers listed in Table 2. In a more preferred embodiment the protein kinase and/or protein phosphatase substrates comprise or consist of, preferably one or more, phosphorylation sites present in all of the peptide markers listed in Table 1 and/or Table 3.

The inventors have found that especially the peptide markers with SEQ ID NO 1 up to SEQ ID NO 10 as listed in Table 1 and with SEQ ID NO 139 up to SEQ ID NO 148 as listed in Table 2 enable the prediction of pharmacotherapy response in melanoma patients, in particular patients treated with Ipilimumab.

The inventors have also found that especially the peptide markers with SEQ ID NO 105, 17, 99, 94, 128, 24, 11, 1, 72, 16, 69, 187, 45, 22, 189, 48, 80, 55, 81, 124, 188, 49 and 60 as listed in Table 1 and/or Table 3 enable the prediction of pharmacotherapy response in melanoma patients, in particular patients treated with Pembrolizumab.

The peptide markers as listed in Table 1, Table 3 and/or Table 2 could serve as an accurate early indicator for therapeutic response in a mammalian subject to measure the effectiveness of candidate melanoma inhibitory agents.

TABLE 1 list of 141 peptide markers comprising phosphorylation sites used for determining the kinase activity, their sequence and SEQ ID NO. The name of the peptide markers refers to the associated proteins and to the start and the end position of the amino acid sequence.

| SEQ ID NO | Name | Sequence |
|---|---|---|
| 1 | CDK7_157_169 | GLAKSFGSPNRAY |
| 2 | TYRO3_679_691 | KIYSGDYYRQGCA |
| 3 | PRGR_786_798 | EQRMKESSFYSLC |
| 4 | PDPK1_369_381 | DEDCYGNYDNLLS |
| 5 | VGFR1_1326_1338 | DYNSVVLYSTPPI |
| 6 | FGFR1_761_773 | TSNQEYLDLSMPL |
| 7 | K2C613_53_65 | GAGFGSRSLYGLG |
| 8 | PRRX2_202_214 | WTASSPYSTVPPY |
| 9 | VGFR3_1061_1073 | DIYKDPDYVRKGS |
| 10 | PGFRB_709_721 | RPPSAELYSNALP |
| 11 | FGFR2_762_774 | TLTTNEEYLDLSQ |
| 12 | EGFR_1165_1177 | ISLDNPDYQQDFF |
| 13 | VGFR1_1320_1332_C1320S/C1321S | SSSPPPDYNSVVL |
| 14 | RON_1353_1365 | YVQLPATYMNLGP |
| 15 | PGFRB_768_780 | SSNYMAPYDNYVP |
| 16 | RET_1022_1034 | TPSDSLIYDDGLS |
| 17 | ANXA1_14_26 | IENEEQEYVQTVK |
| 18 | FGFR3_753_765 | TVTSTDEYLDLSA |
| 19 | ODBA_340_352 | DDSSAYRSVDEVN |
| 20 | PDPK1_2_14 | ARTTSQLYDAVPI |
| 21 | TEC_512_524 | RYFLDDQYTSSSG |
| 22 | FER_707_719 | RQEDGGVYSSSGL |

TABLE 1-continued list of 141 peptide markers comprising phosphorylation sites used for determining the kinase activity, their sequence and SEQ ID NO. The name of the peptide markers refers to the associated proteins and to the start and the end position of the amino acid sequence.

| SEQ ID NO | Name | Sequence |
|---|---|---|
| 23 | PGFRB_1002_1014 | LDTSSVLYTAVQP |
| 24 | CBL_693_705 | EGEEDTEYMTPSS |
| 25 | R6_804_816 | IYISPLKSPYKIS |
| 26 | VGFR2_1052_1064 | DIYKDPDYVRKGD |
| 27 | FAK1_569_581 | RYMEDSTYYKASK |
| 28 | MET_1227_1239 | RDMYDKEYYSVHN |
| 29 | NTRK2_696_708 | GMSRDVYSTDYYR |
| 30 | DYR1A_312_324 | CQLGQRIYQYIQS |
| 31 | CD3Z_146_158 | STATKDTYDALHM |
| 32 | DCX_109_121 | GIVYAVSSDRFRS |
| 33 | PGFRB_771_783 | YMAPYDNYVPSAP |
| 34 | LCK_387_399 | RLIEDNEYTAREG |
| 35 | JAK1_1015_1027 | AIETDKEYYTVKD |
| 36 | VGFR2_1168_1180 | AQQDGKDYIVLPI |
| 37 | MK07_211_223 | AEHQYFMTEYVAT |
| 38 | MBP_198_210 | ARTAHYGSLPQKS |
| 39 | B3AT_39_51 | TEATATDYHTTSH |
| 40 | CD3Z_116_128 | KDKMAEAYSEIGM |
| 41 | ANXA2_17_29 | HSTPPSAYGSVKA |
| 42 | EGFR_1190_1202 | STAENAEYLRVAP |
| 43 | CALM_95_107 | KDGNGYISAAELR |
| 44 | PECA1_706_718 | KKDTETVYSEVRK |
| 45 | EPOR_361_373 | SEHAQDTYLVLDK |
| 46 | EPHA2_765_777 | EDDPEATYTTSGG |
| 47 | STAT4_714_726 | PSDLLPMSPSVYA |
| 48 | FES_706_718 | REEADGVYAASGG |
| 49 | EPHB1_771_783 | DDTSDPTYTSSLG |
| 50 | PP2AB_297_309 | EPHVTRRTPDYFL |
| 51 | CRK_214_226 | GPPEPGPYAQPSV |
| 52 | LAT_249_261 | EEGAPDYENLQEL |
| 53 | VGFR2_989_1001 | EEAPEDLYKDFLT |
| 54 | FAK2_572_584 | RYIEDEDYYKASV |
| 55 | CDK2_8_20 | EKIGEGTYGVVYK |
| 56 | CTNB1_79_91 | VADIDGQYAMTRA |
| 57 | ERBB2_1241_1253 | PTAENPEYLGLDV |

TABLE 1-continued list of 141 peptide markers comprising phosphorylation sites used for determining the kinase activity, their sequence and SEQ ID NO. The name of the peptide markers refers to the associated proteins and to the start and the end position of the amino acid sequence.

| SEQ ID NO | Name | Sequence |
|---|---|---|
| 58 | RON_1346_1358 | SALLGDHYVQLPA |
| 59 | PGFRB_1014_1028 | PNEGDNDYIIPLPDP |
| 60 | EPHA1_774_786 | LDDFDGTYETQGG |
| 61 | ZAP70_485_497 | ALGADDSYYTARS |
| 62 | ERBB4_1181_1193 | QALDNPEYHNASN |
| 63 | 41_654_666 | LDGENIYIRHSNL |
| 64 | MK01_180_192 | HTGFLTEYVATRW |
| 65 | VGFR2_1046_1058 | DFGLARDIYKDPD |
| 66 | PAXI_24_36 | FLSEETPYSYPTG |
| 67 | RAF1_332_344 | PRGQRDSSYYWEI |
| 68 | ACHD_383_395 | YISKAEEYFLLKS |
| 69 | FRK_380_392 | KVDNEDIYESRHE |
| 70 | KSYK_518_530 | ALRADENYYKAQT |
| 71 | RASA1_453_465 | TVDGKEIYNTIRR |
| 72 | PLCG1_764_776 | IGTAEPDYGALYE |
| 73 | K2C8_425_437 | SAYGGLTSPGLSY |
| 74 | ART_004_EAIYAAPFAKKKXC | EAIYAAPFAKKK |
| 75 | EPOR_419_431 | ASAASFEYTILDP |
| 76 | EGFR_1103_1115 | GSVQNPVYHNQPL |
| 77 | JAK2_563_577 | VRREVGDYGQLHETE |
| 78 | MK10_216_228 | TSFMMTPYVVTRY |
| 79 | DYR1A_212_224 | KHDTEMKYYIVHL |
| 80 | P85A_600_612 | NENTEDQYSLVED |
| 81 | PAXI_111_123 | VGEEEHVYSFPNK |
| 82 | EPHB4_583_595 | IGHGTKVYIDPFT |
| 83 | MK12_178_190 | ADSEMTGYVVTRW |
| 84 | VGFR1_1040_1052 | DFGLARDIYKNPD |
| 85 | PGFRB_572_584 | VSSDGHEYIYVDP |
| 86 | EPHA7_607_619 | TYIDPETYEDPNR |
| 87 | ER662_870_882 | LDIDETEYHADGG |
| 88 | LAT_194_206 | MESIDDYVNVPES |
| 89 | VINC_815_827 | KSFLDSGYRILGA |
| 90 | NCF1_313_325 | QRSRKRLSQDAYR |
| 91 | ERBB4_1277_1289 | IVAENPEYLSEFS |
| 92 | VGFR2_944_956 | RFRQGKDYVGAIP |
| 93 | NPT2A_501_513 | AKALGKRTAKYRW |
| 94 | C1R_199_211 | TEASGYISSLEYP |
| 95 | FABPH_13_25 | DSKNFDDYMKSLG |
| 96 | STAT1_694_706 | DGPKGTGYIKTEL |
| 97 | EPHA4_589_601 | LNQGVRTYVDPFT |
| 98 | VGFR1_1046_1058_Y1048F | DIFKNPDYVRKGD |
| 99 | INSR_992_1004 | YASSNPEYLSASD |
| 100 | NTRK2_509_521 | PVIENPQYFGITN |
| 101 | MBP_259_271 | FGYGGRASDYKSA |
| 102 | STA5A_687_699 | LAKAVDGYVKPQI |
| 103 | NTRK1_489_501 | HIIENPQYFSDAC |
| 104 | PTN11_539_551 | SKRKGHEYTNIKY |
| 105 | PLCG1_776_788 | EGRNPGFYVEANP |
| 106 | MK14_173_185 | RHTDDEMTGYVAT |
| 107 | MBP_263_275 | GRASDYKSAHKGF |
| 108 | RBL2_99_111 | VPTVSKGTVEGNY |
| 109 | RET_680_692 | AQAFPVSYSSSGA |
| 110 | EGFR_862_874 | LGAEEKEYHAEGG |
| 111 | INSR_1348_1360 | SLGFKRSYEEHIP |
| 112 | PRGR_545_557 | LRPDSEASQSPQY |
| 113 | SRC8_CHICK_470_482 | VSQREAEYEPETV |
| 114 | EPHA2_581_593 | QLKPLKTYVDPHT |
| 115 | VGFR1_1162_1174 | VQQDGKDYIPINA |
| 116 | MK01_198_210 | IMLNSKGYTKSID |
| 117 | STAT6_634_646 | MGKDGRGYVPATI |
| 118 | VGFR2_1207_1219_C1208S | VSDPKFHYDNTAG |
| 119 | ZBT16_621_633 | LRTHNGASPYQCT |
| 120 | EGFR_1118_1130 | APSRDPHYQDPHS |
| 121 | AMPE_5_17 | EREGSKRYCIQTK |
| 122 | FGFR3_641_653 | DVHNLDYYKKTTN |
| 123 | VGFR1_1206_1218 | GSSDDVRYVNAFK |
| 124 | EFS_246_258_Y253F | GGTDEGIFDVPLL |
| 125 | ODPAT_291_303 | SMSDPGVSYRTRE |
| 126 | STAT4_686_698 | TERGDKGYVPSVF |
| 127 | PLCG1_1246_1258 | EGSFESRYQQPFE |

TABLE 1-continued list of 141 peptide markers comprising phosphorylation sites used for determining the kinase activity, their sequence and SEQ ID NO. The name of the peptide markers refers to the associated proteins and to the start and the end position of the amino acid sequence.

| SEQ ID NO | Name | Sequence |
|---|---|---|
| 128 | TNNT1_2_14 | SDTEEQEYEEEQP |
| 129 | EGFR_908_920 | MTFGSKPYDGIPA |
| 130 | EPH_61_921_933 | SAIKMVQYRDSFL |
| 131 | VGFR1_1235_1247 | ATSMFDDYQGDSS |
| 132 | STAT3_698_710 | DPGSAAPYLKTKF |
| 133 | CALM_93_105 | FDKDGNGYISAAE |
| 134 | DDR1_506_518 | LLLSNPAYRLLLA |
| 135 | EGFR_1062_1074 | EDSFLQRYSSDPT |
| 136 | EPHA4_921_933 | QAIKMDRYKDNFT |
| 137 | PERI_458_470 | QRSELDKSSAHSY |
| 138 | VGFR1_1049_1061 | KNPDYVRKGDTRL |

TABLE 2 list of 48 peptide markers comprising phosphorylation sites used for determining the phosphatase activity, their sequence, extended sequence and SEQ ID NO. The name of the peptide markers refers to the associated proteins, the start and the end position of the amino acid sequence and the position of the nitrophosphate (shown in the extended sequence).

| SEQ ID NO | Name | Sequence | ExtendedSequence |
|---|---|---|---|
| 139 | RET_1024_1033_Y1029npY | SDSLIYDDGL | SDSLI(NO2-pY)DDGL |
| 140 | RET_682_691_Y687npY | AFPVSYSSSG | AFPVS(NO2-pY)SSSG |
| 141 | FRK_382_391_Y387npY | DNEDIYESRH | DNEDI(NO2-pY)ESRH |
| 142 | MK01_182_191_Y187npY | FGLTEYVATR | FGLTE(NO2-pY)VATR |
| 143 | MK01_198_207_Y203npY | LNSKGYTKSI | LNSKG(NO2-pY)TKSI |
| 144 | CBL_695_704_Y700npY | EEDTEYBTPS | EEDTE(NO2-pY)BTPS |
| 145 | P85A_602_611_Y607npY | NTEDQYSLVE | NTEDQ(NO2-pY)SLVE |
| 146 | FAK1_572_581_Y577npY | EDSTYYKASK | EDSTY(NO2-pY)KASK |
| 147 | FAK1_572_581_Y576npY | EDSTYYKASK | EDST(NO2-pY)YKASK |
| 148 | CRK_216_226_Y221npY | PEPGPYAQPSV | PEPGP(NO2-pY)AQPSV |
| 149 | MET_1229_1239_Y1235npY | BYDKEYYSVHN | BYDKEY(NO2-pY)SVHN |
| 150 | MET_1229_1239_Y1234npY | BYDKEYYSVHN | BYDKE(NO2-pY)YSVHN |
| 151 | PGFRB_1016_1025_Y1021npY | EGDNDYIIPL | EGDND(NO2-pY)IIPL |
| 152 | MK12_180_189_Y185npY | SEBTGYVVTR | SEBTG(NO2-pY)VVTR |
| 153 | MBP_198_207_Y203npY | ARTAHYGSLP | ARTAH (NO2-pY)GSLP |
| 154 | MBP_263_272_Y268npY | GRASDYKSAH | GRASD(NO2-pY)KSAH |
| 155 | CADH2_780_789_Y785npY | EEDQDYDLSQ | EEDQD(NO2-pY)DLSQ |
| 156 | PDPK1_4_13_Y9npY | TTSQLYDAVP | TTSQL(NO2-pY)DAVP |
| 157 | ZAP70_287_296_Y292npY | LNSDGYTPEP | LNSDG(NO2-pY)TPEP |
| 158 | PGFRB_746_755_Y751npY | DESVDYVPBL | DESVD(NO2-pY)VPBL |
| 159 | GHR_591_600_Y595npY | PVPDYTSIHI | PVP D(NO2-pY)TSIHI |
| 160 | CSK_179_188_Y184npY | AQDEFYRSGW | AQDEF(NO2-pY)RSGW |
| 161 | SIGLEC2_817_826_Y822npY | DEGIHYSELI | DEGIH(NO2-pY)SELI |

TABLE 2-continued list of 48 peptide markers comprising phosphorylation sites used for determining the phosphatase activity, their sequence, extended sequence and SEQ ID NO. The name of the peptide markers refers to the associated proteins, the start and the end position of the amino acid sequence and the position of the nitrophosphate (shown in the extended sequence).

| SEQ ID NO | Name | Sequence | ExtendedSequence |
|---|---|---|---|
| 162 | STAT3_701_709_Y705npY | SAAPYLKTK | SAAP(NO2-pY)LKTK |
| 163 | JAK2_1002_1011_Y1007npY | PQDKEYYKVK | PQDKE(NO2-pY)YKVK |
| 164 | LCK_389_399_Y394npY | IEDNEYTAREG | IEDNE(NO2-pY)TAREG |
| 165 | INSR_994_1004_Y999npY | SSNPEYLSASD | SSNPE(NO2-pY)LSASD |
| 166 | INSR_1350_1360_Y1355npY | GFKRSYEEHIP | GFKRS(NO2-pY)EEHIP |
| 167 | EGFR_1192_1202_Y1197npY | AENAEYLRVAP | AENAE(NO2-pY)LRVAP |
| 168 | EGFR_1011_1021_Y1016npY | VDADEYLIPQQ | VDADE(NO2-pY)LIPQQ |
| 169 | VGFR1_1208_1218_1213npY | SDDVRYVNAFK | SDDVR(NO2-pY)VNAFK |
| 170 | STA5A_689_699_Y694npY | KAVDGYVKPQI | KAVDG(NO2-pY)VKPQI |
| 171 | EGFR_1064_1074_Y1069npY | SFLQRYSSDPT | SFLQR(NO2-pY)SSDPT |
| 172 | ALK_1073_1083_Y1078npY | LQSPEYKLSKL | LQSPE(NO2-pY)KLSKL |
| 173 | TEC_514_524_Y519npY | FLDDQYTSSSG | FLDDQ(NO2-pY)TSSSG |
| 174 | CDK2_10_20_Y15npY | IGEGTYGVVYK | IGEGT(NO2-pY)GVVYK |
| 175 | RAF1_335_345_Y340npY | QRDSSYYWEIE | QRDSS(NO2-pY)YWEIE |
| 176 | PECA1_708_718_Y713npY | DTETVYSEVRK | DTETV(NO2-pY)SEVRK |
| 177 | STAT1_696_706_Y701npY | PKGTGYIKTEL | PKGTG(NO2-pY)IKTEL |
| 178 | ERBB2_1243_1253_Y1248npY | AENPEYLGLDV | AENPE(NO2-pY)LGLDV |
| 179 | PAXI_113_123_Y118npY | EEEHVYSFPNK | EEEHV(NO2-pY)SFPNK |
| 180 | EPOR_421_430_Y426npY | AASFEYTILD | AASFE(NO2-pY)TILD |
| 181 | CTNN B1_81_91_Y86npY | DIDGQYABTRA | DIDGQ(NO2-pY)ABTRA |
| 182 | ART_003_Y4pY | EAIYAAPFAKKK | EAI(pY)AAPFAKKK |
| 183 | TIE1_1002_1012_Y1007npY | RGEEVYVKKTB | RGEEV(NO2-pY)VKKTB |
| 184 | SELE_598_608_Y603npY | ESDGSYQKPSY | ESDGS(NO2-pY)QKPSY |
| 185 | BCR_172_182_Y177npY | AEKPFYVNVEF | AEKPF(NO2-pY)VNVEF |
| 186 | STAT3_701_709_Y705nY | SAAPYLKTK | SAAP(NO2-Y)LKTK |

TABLE 3 list of 3 peptide markers comprising phosphorylation sites used for determining the kinase activity, their sequence and SEQ ID NO. The name of the peptide markers refers to the associated proteins and to the start and the end position of the amino acid sequence.

| SEQ ID NO | Name | Sequence |
|---|---|---|
| 187 | ENOG_37_49 | SGASTGIYEALEL |
| 188 | SRC8_CHICK_476_488 | EYEPETVYEVAGA |
| 189 | SRC8_CHICK_492_504 | YQAEENTYDEYEN |

It should further be noted that according to a preferred embodiment of the present invention the peptide markers as listed in Table 1, Table 3 and/or Table 2 can be used as such for carrying out the methods according to the present invention. The present invention however also includes the use of analogs and combinations of these peptide markers for use in the method according to the present invention. The peptide marker analogs include peptide markers which show a sequence identity of more than 70%, preferably more than 80% and more preferably more than 90%.

In yet another embodiment, the present invention relates to a method for predicting the response of a patient diagnosed with melanoma cancer, to a medicament, comprising the steps of:
(a) measuring the kinase and/or phosphatase activity of a sample, obtained from said patient diagnosed with melanoma, by contacting said sample with at least one protein kinase substrate and/or at least one protein phosphatase substrate, thereby providing a phosphorylation profile of said sample, said phosphorylation profile comprising the phosphorylation levels of phosphorylation sites present in at least 10 peptide markers as listed in Table 1 and/or Table 3, and/or in at least 10 peptide markers as listed Table 2; and, (c) calculating a classifier parameter from said phosphorylation profile; and, (d) determining the response of said patient to said medicament on the basis of said classifier parameter.

By establishing a classifier parameter for determining the prediction of pharmacotherapy response of the melanoma patient the method of the present invention provides a criterion for analysing the results obtained from the method of the present invention. This criterion enables a person to provide a prediction or prognosis on the basis of a single or limited number of data. The person providing the prediction or prognosis does not have to interpret an entire set of data, but rather bases his conclusion on the basis of a single or limited number of criteria.

The term "classifier parameter" as used herein is a discriminating value which has been determined by establishing the phosphorylation profile of a sample obtained from a patient suffering from melanoma skin cancer. Said discriminating value identifies the prediction of response to pharmacotherapy of melanoma patients. The classifier parameter includes information regarding the phosphorylation level of several protein kinase and/or protein phosphatase substrates. Classification is a procedure in which individual items are placed into groups based on quantitative information on one or more characteristics inherent in the items (e.g. phosphorylation levels or profiles of a sample) and based on a training set of previously labelled items (clinical response to a pharmacotherapy). The classifier parameter is calculated by applying a "classifier" to the measured phosphorylation levels of a sample. Based on the classifying parameter a sample is assigned to (or predicted to belong to) a class (predicting the pharmacotherapy response of said patient). The classifier has been previously determined by comparing samples which are known to belong to the respective relevant classes. For instance the classifier may be a mathematical function that uses information regarding the phosphorylation level of several protein kinase and/or phosphatase substrates which individual protein kinase and/or protein phosphatase substrates can be statistically weighted based on the measured phosphorylation level of a number of protein kinase and/or protein phosphatase substrates (or values derived from that). Several methods are known in the art for developing a classifier including the neural network (Multi-layer Perceptron), support vector machines, k-nearest neighbours, Gaussian mixture model, naive bayes, decision tree, RBF classifiers, random forest, disciminant analysis, linear discriminant analysis, quadratic discriminant analysis, discriminant analysis—principal component analysis, partial least squares discriminant analysis, generalized distance regression and elastic net classification. The classifier parameter determined in this manner is valid for the same experimental setup in future individual tests.

It is not relevant to give an exact threshold value for the classifier parameter. A relevant threshold value can be obtained by correlating the sensitivity and specificity and the sensitivity/specificity for any threshold value. A threshold value resulting in a high sensitivity results in a lower specificity and vice versa. If one wants to increase the positive predictive value of the test to determine whether melanoma patient will respond to targeted pharmacotherapy, then the threshold value of the test can be changed which as a consequence will decrease the negative predictive value of the test to determine whether melanoma patient will not respond to targeted pharmacotherapy. If one wants to increase the negative predictive value of the test to determine whether melanoma patient will not respond to targeted pharmacotherapy, then the threshold value can be changed in the opposite direction which as a consequence will decrease the positive predictive value of the test to determine whether melanoma patient will respond to targeted pharmacotherapy It is thus up to the diagnostic engineers to determine which level of positive predictive value/negative predictive value/sensitivity/specificity is desirable and how much loss in positive or negative predictive value is tolerable. The chosen threshold level could be dependent on other diagnostic parameters used in combination with the present method by the diagnostic engineers.

In yet another embodiment, the present invention relates to a method according to the present invention wherein said classifier parameter predicts the response of said patient to said medicament if said classifier parameter is above a first predetermined threshold level, and wherein said classifier parameter indicates non-response to said medicament of said patient if said classifier parameter is below a second predetermined threshold level.

According to another embodiment, the present invention relates to the method of the present invention wherein said differential phosphorylation level or said classifier parameter indicates a response, no-response or undetermined or intermediate prediction of said medicament or the effect of the targeted pharmacotherapy of said patient.

As used in the present application the prediction of response to targeted pharmacotherapy of melanoma patients is generally divided into two types of non-responders and responders and additionally some undetermined or intermediate responders. Whereas responders to a targeted pharmacotherapy will survive longer or have additional clinical benefits (e.g. improved quality of life, prolonged progression free survival, etc.) due to the treatment, the non-responders to a targeted pharmacotherapy will not benefit from the targeted pharmacotherapy. The method of the present invention specifically enables the distinction between responders and non-responders to a targeted pharmacotherapy.

The medicament as used in the method of the present invention can be any kind of chemical substance for instance used in the treatment, cure, prevention, or diagnosis of disease or used to otherwise enhance physical or mental well-being. Specifically said medicament can be an immunotherapeutic antibody, more preferably an immunotherapeutic antibody directed against an immune checkpoint, even more preferably an immunotherapeutic antibody directed against CTLA-4, PD-1 or PD-L1.

As used herein, the term "immunotherapeutic antibody" refers to a type of antibody, preferably a monoclonal antibody, which binds to a specific cell or protein, preferably a cell surface protein, and thereby stimulates the immune system to attack those cells. The immunotherapeutic antibody is used in the treatment, cure, prevention, or diagnosis of disease or used to otherwise enhance physical or mental well-being.

As used herein, the term "immune checkpoint" refers to an inhibitory pathways hardwired into the immune system that is crucial for maintaining self-tolerance and modulating the duration and amplitude of physiological immune responses in peripheral tissues in order to minimize collateral tissue damage. Tumors can designate one or multiple immune-checkpoint pathways as a major mechanism of immune resistance, particularly against T cells that are specific for tumor antigens. Immune checkpoints can be blocked by antibodies. Examples of such immune checkpoints are CTLA-4, PD-1 and PD-L1.

More preferably the present invention relates to a method according to the present invention wherein said medicament is chosen from the list comprising Ipilimumab, Nivolumab, Pembrolizumab, Pidilizumab, BMS-936559, Atezolizumab and/or a combination thereof and/or a combination thereof and/or analogs thereof. Preferably said medicament is Ipilimumab, Nivolumab or Pembrolizumab and/or a combination thereof and/or a combination thereof and/or analogs thereof.

Another a further embodiment, the kinase and/or phosphatase substrates carrying phosphorylation sites according to the present invention are located or immobilized on a solid support, and preferably a porous solid support. Preferably said immobilized kinase and/or phosphatase substrates carrying phosphorylation sites will be immobilized proteins, peptides or peptide mimetics. More preferably, the peptides are immobilized on a solid support.

As used herein "peptide" refers to a short truncated protein generally consisting of 2 to 100, preferably 2 to 30, more preferably 5 to 30 and even more preferably 13 to 18 naturally occurring or synthetic amino acids which can also be further modified including covalently linking the peptide bonds of the alpha carboxyl group of a first amino acid and the alpha amino group of a second amino acid by eliminating a molecule of water. The amino acids can be either those naturally occurring amino acids or chemically synthesized variants of such amino acids or modified forms of these amino acids which can be altered from their basic chemical structure by addition of other chemical groups which can be found to be covalently attached to them in naturally occurring compounds.

As used herein "protein" refers to a polypeptide made of amino acids arranged in a linear chain and joined together by peptide bonds between the carboxyl and amino groups of adjacent amino acid residues.

As used herein "peptide mimetics" refers to organic compounds which are structurally similar to peptides and similar to the peptide sequences list in Table 1, Table 3 and/or Table 2. The peptide mimetics are typically designed from existing peptides to alter the molecules characteristics. Improved characteristics can involve, for example improved stability such as resistance to enzymatic degradation, or enhanced biological activity, improved affinity by restricted preferred conformations and ease of synthesis. Structural modifications in the peptidomimetic in comparison to a peptide, can involve backbone modifications as well as side chain modification.

For measuring the kinase and/or phosphatase activity of the sample a large variety of methods and formats are known in the art. The kinase and/or phosphatase activity can for example be measured using ELISA and multiplex ELISA techniques, blotting methods, mass spectrometry, surface plasmon resonance, capillary electrophoresis, bead arrays, macroarrays, microarrays or any other method known in the art. Depending on the type of kinase and/or phosphatase activity measurement method the solid support on which the proteins, peptides or peptide mimetics are fixed may vary. Whereas in ELISA the protein kinase and/or protein phosphatase substrates are attached to the surface of the microtiterplates, in microarrays the protein kinase and/or protein phosphatase substrates are immobilized on and/or in the microarray substrate. Alternatively the substrates are synthesized in-situ direct on the microarray substrate.

In a preferred embodiment of the present invention the protein kinase and/or protein phosphatase substrates are immobilized on an array, and preferably a microarray of protein kinase and/or protein phosphatase substrates wherein the protein kinase and/or protein phosphatase substrates are immobilized onto a solid support or another carrier. The immobilization can be either the attachment or adherence of two or more protein kinase and/or protein phosphatase substrate molecules to the surface of the carrier including attachment or adherence to the inner surface of said carrier in the case of e.g. a porous or flow-through solid support.

In a preferred embodiment of the present invention, the array of protein kinase and/or protein phosphatase substrates is a flow-through array. The flow-through array as used herein could be made of any carrier material having oriented through-going channels as are generally known in the art, such as for example described in PCT patent publication WO 01/19517. Typically the carrier is made from a metal oxide, glass, silicon oxide or cellulose. In a particular embodiment the carrier material is made of a metal oxide selected from the group consisting of zinc oxide, zirconium oxide, tin oxide, aluminum oxide, titanium oxide and thallium; in a more particular embodiment the metal oxide consists of aluminum oxide.

Accordingly, in a further embodiment of the present invention said array is a Pamchip®.

In a further embodiment, the present invention relates to a method according to the present invention wherein said solid support (microarray) comprises at least 10 peptide markers as listed in Table 1 and/or Table 3, and/or at least 10 peptide markers as listed in Table 2 immobilized thereto.

In a further embodiment, the present invention relates to a method according to the present invention wherein said solid support (microarray) comprises each of the peptide as listed in Table 1 and/or Table 3, and/or Table 2 immobilized thereto.

In a further embodiment, the present invention relates to a method according to the present invention wherein said melanoma is an irresectable stage IIIc or IV melanoma.

Phosphorylation levels can also be measured according to the invention, without the necessity to generate phosphorylation profiles thereof. Also for this embodiment, the amount and the type of peptides, proteins or peptide mimetics to be used is as described above.

The present invention also relates in another embodiment to a computer program product for use in conjunction with a computer having a processor and a memory connected to the processor, said computer program product comprising a computer readable storage medium having a computer program mechanism encoded thereon, wherein said computer program mechanism may be loaded into the memory of said computer and cause said computer to carry out the method according to the present invention.

The present invention further relates to a computer system comprising a processor, and a memory coupled to said processor and encoding one or more programs, wherein said one or more programs instruct the processor to carry out the methods according to the present invention.

The present invention also relates in another embodiment to a kit for determining the response of a patient diagnosed with melanoma, to a medicament, comprising at least one array comprising at least 10 peptide markers as listed in Table 1 and/or Table 3, and/or at least 10 peptide markers as listed in Table 2, and a computer readable storage medium having recorded thereon one or more programs for carrying out the method according to the present invention. In particular embodiment, the present invention relates to a kit for determining the response of a patient diagnosed with melanoma, to a medicament, comprising two arrays, a first array comprising at least 10 peptide markers as listed in Table 1 and/or Table 3, and a second array comprising at least 10 peptide markers as listed in Table 2, and a computer readable storage medium having recorded thereon one or more programs for carrying out the method according to the present invention.

The present invention further relates in yet another embodiment to the use at least 10 peptide markers as listed in Table 1 and/or Table 3, and/or at least 10 peptide markers as listed in Table 2 for predicting the response of a patient diagnosed with melanoma cancer to a medicament.

In a particular embodiment, the present invention relates to the use of the peptide markers as listed in Table 1, Table 3 and/or Table 2 for predicting the response of a patient diagnosed with melanoma cancer to a medicament.

Since the present inventors have identified a surprisingly useful set of peptide markers to be used in methods for determining the prediction of response to a targeted pharmacotherapy of a patient suffering from melanoma, the skilled man may carry out any method as defined above wherein he measures the kinase and/or phosphatase activity of any of the peptide markers of Table 1, Table 3 and/or Table 2. Also this method may be carried out using the amount and type of peptides, proteins or protein mimetics as defined above. The formats for carrying out these methods are also as for the methods described above.

The present invention is hereafter exemplified by the illustration of particular, non-limiting examples.

EXAMPLES

Example 1

Example Showing how Responders and Non-Responders to Targeted Pharmacotherapy can be Differentiated According to a Phosphorylation Inhibition Profile A clinical study was conducted using blood samples from ten melanoma patients with a histologically or cytologically proven irresectable stage IIIc or IV melanoma, which were treated with Ipilimumab. This allowed a comparison with the clinical responses.

In all the analyses, the first step was the isolation of PMBCs from the blood sample by Ficoll-Isopaque density centrifugation. Next, PBMCs were frozen in liquid N2 and subsequently lysed to allow extraction of the proteins. The kinase and phosphatase activity profiling was performed on a PamStation96 or a PamStation12 instrument that runs 96 (or 12) peptide microarrays. Each condition was run in multiple replicates. A range of 0.5 to 5 µg of total protein was tested in the kinase and phosphatase activity assays. 1 to 2 µg of total protein per assay was shown to be sufficient to obtain high signals. Besides the basal activity profiles, the same blood samples were analysed in the presence and absence of an protease inhibitor (Halt™ protease inhibitor cocktail which consists of an optimized concentration of six broad-spectrum protease inhibitors AEBSF, aprotinin, bestatin, E-64, leupeptin and pepstatin A (Thermo Scientific)) Addition of a protein kinase inhibitor to the protein tyrosine kinase assay and on the other hand, addition of a protein phosphatase inhibitor to the protein tyrosine phosphatase assay both showed a reduced signal (white no inhibition by X, black 100% inhibition by X) (FIG. 1).

Figure 2:
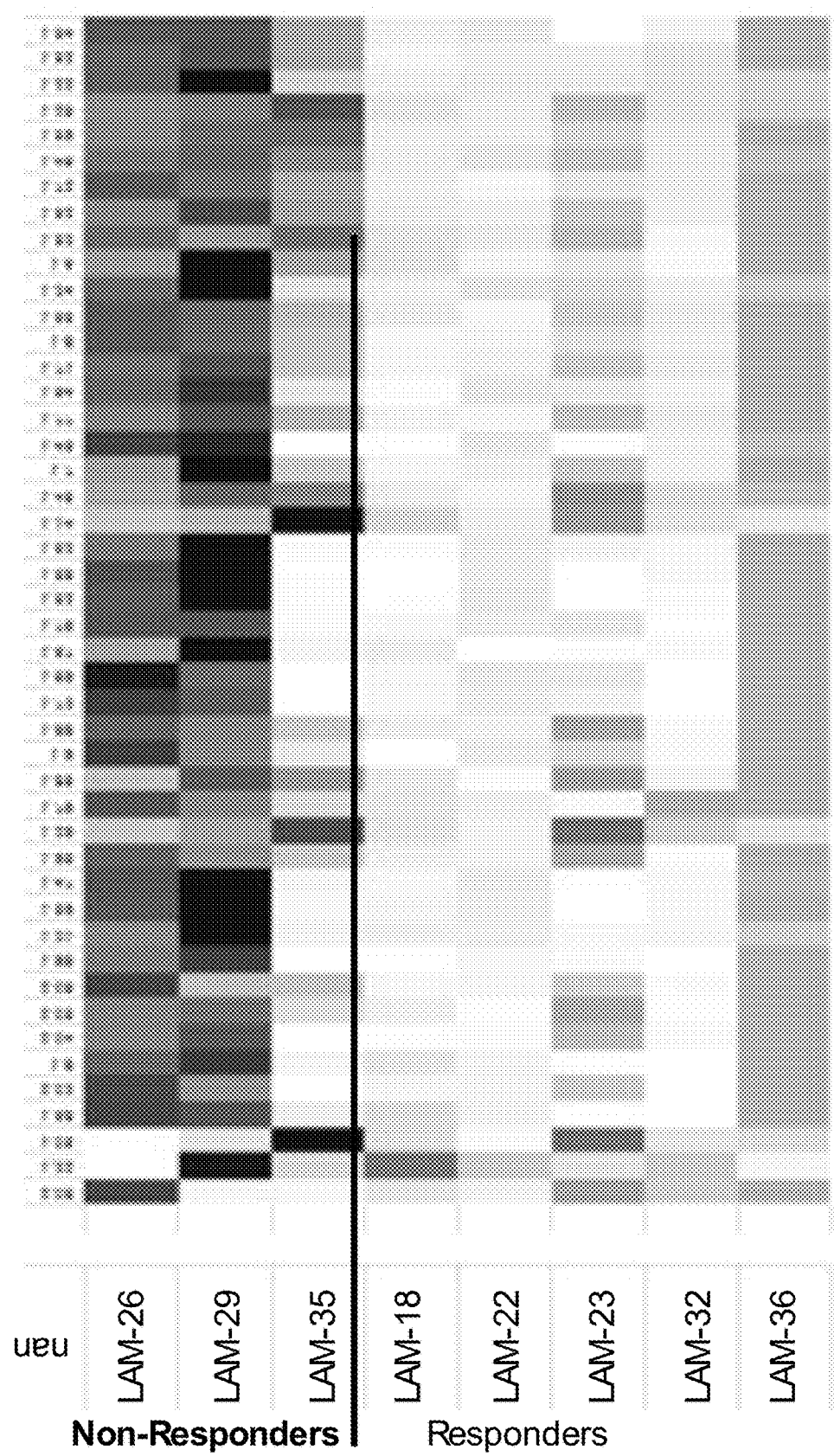
FIG. 2 shows the phosphatase activity profiling of ten patient-derived PBMC samples and the profiles correlation to response. The intensity of the phosphatase activities correlates almost perfectly with the clinical response (87.5%). Hence, the method according to the invention allows a good prediction of the treatment outcome of patients treated with Ipilimumab.
Figure 2:
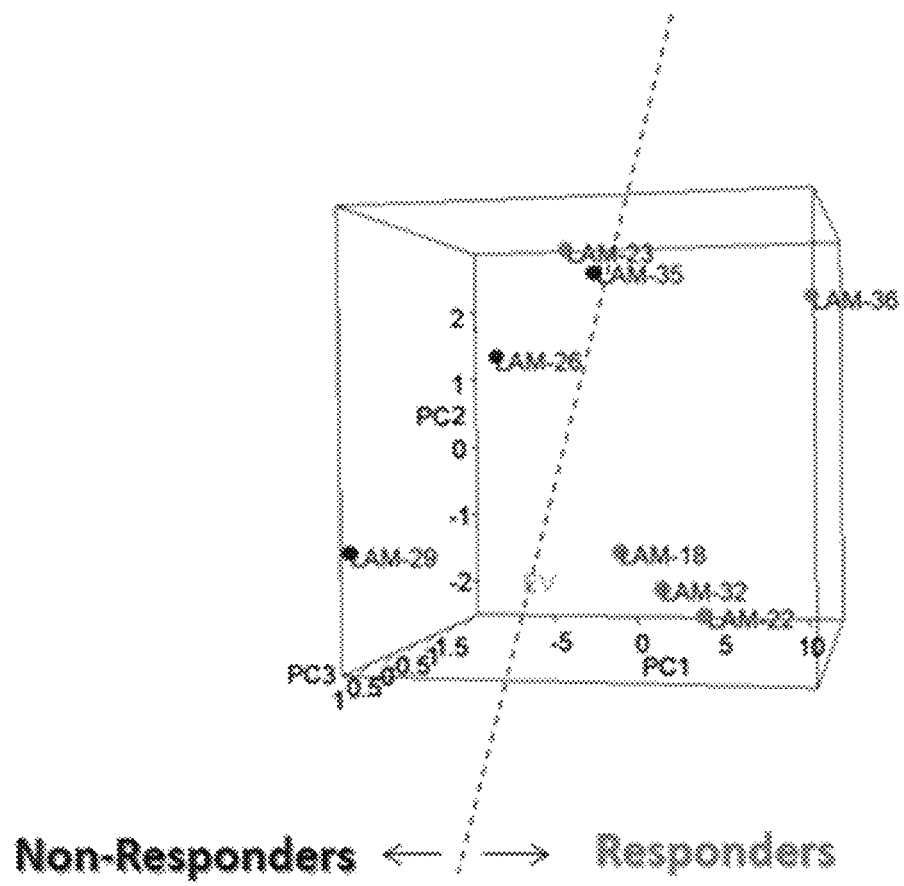

FIG. 2 shows the residual phosphatase activity on the peptides markers as listed in Table 2 and the correlation of the phosphatase activity profile to the treatment outcome of the patients to Ipilimumab. The tumor samples of the five melanoma patients who clinically responded to the Ipilimumab medicament treatment are indicated as "R" (LAM-18, -22, -23, -32 and -36) and the tumor samples of the five melanoma patients who clinically did not response to Ipilimumab medicament treatment are indicated as "NR" (LAM-05, -14, -26, -29 and -35). High phosphatase activities were found in responders, low in poor responders. The analysis was performed completely blinded.

Figure 3:
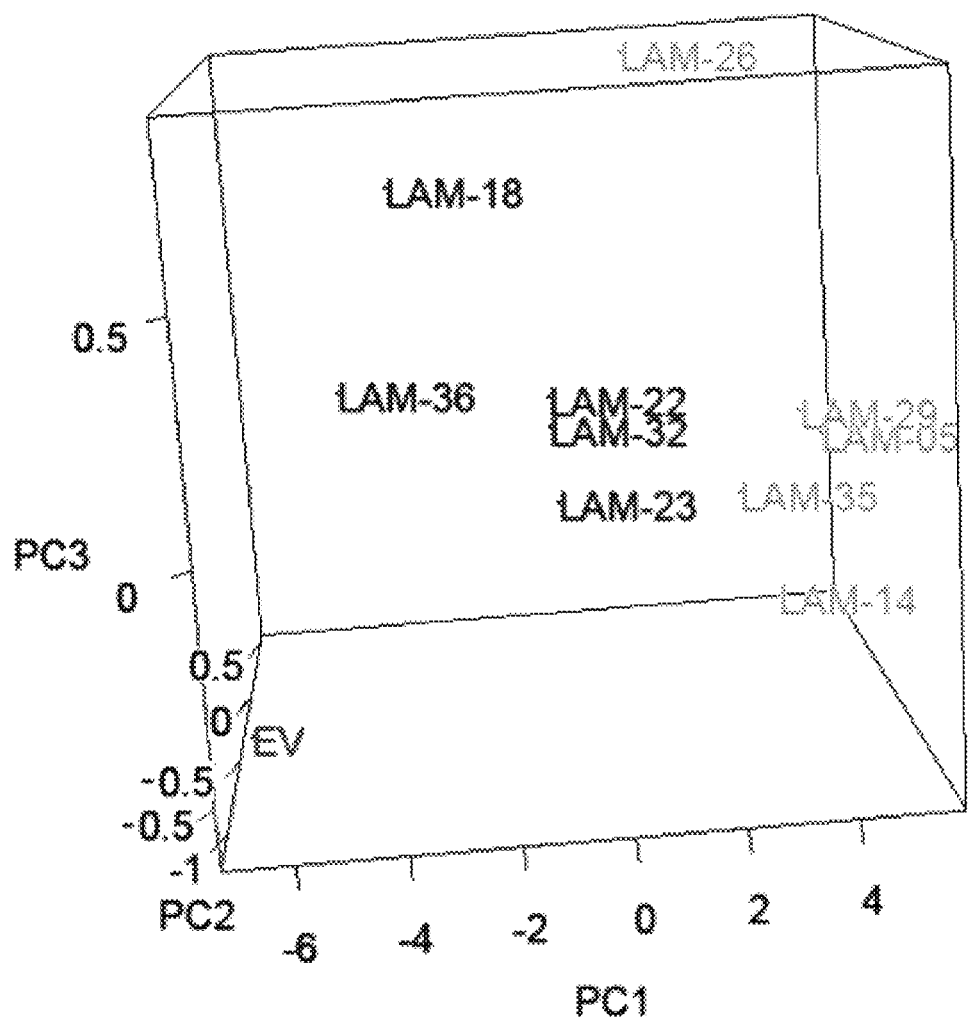
FIG. 3 shows the kinase activity profiling of ten patient-derived PBMC samples and the profiles correlation to response. The intensity of the kinase activities correlates almost perfectly with the clinical response. Hence, the method according to the invention allows a good prediction of the treatment outcome of patients treated with Ipilimumab.
Figure 3:
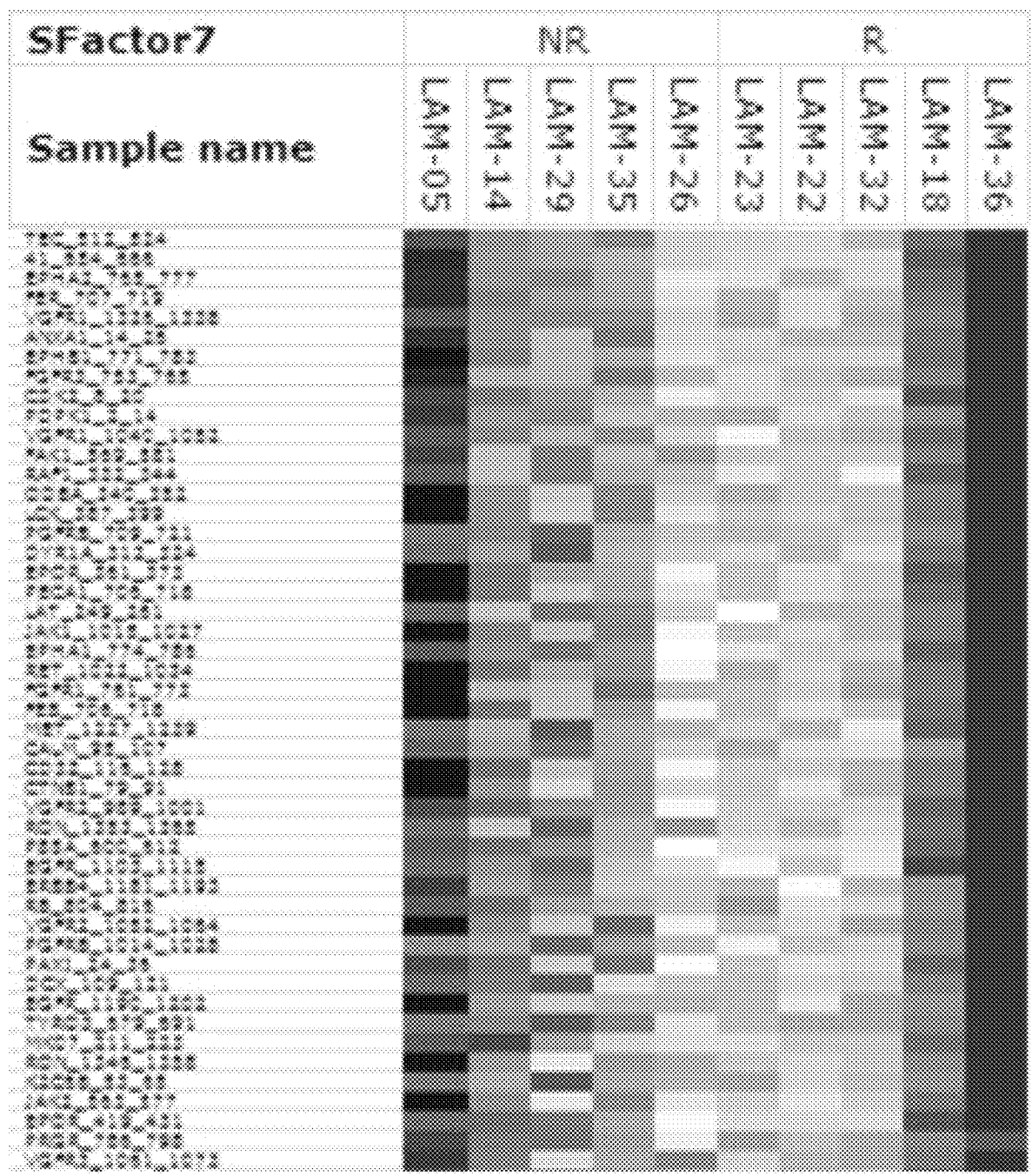
Figure 3:
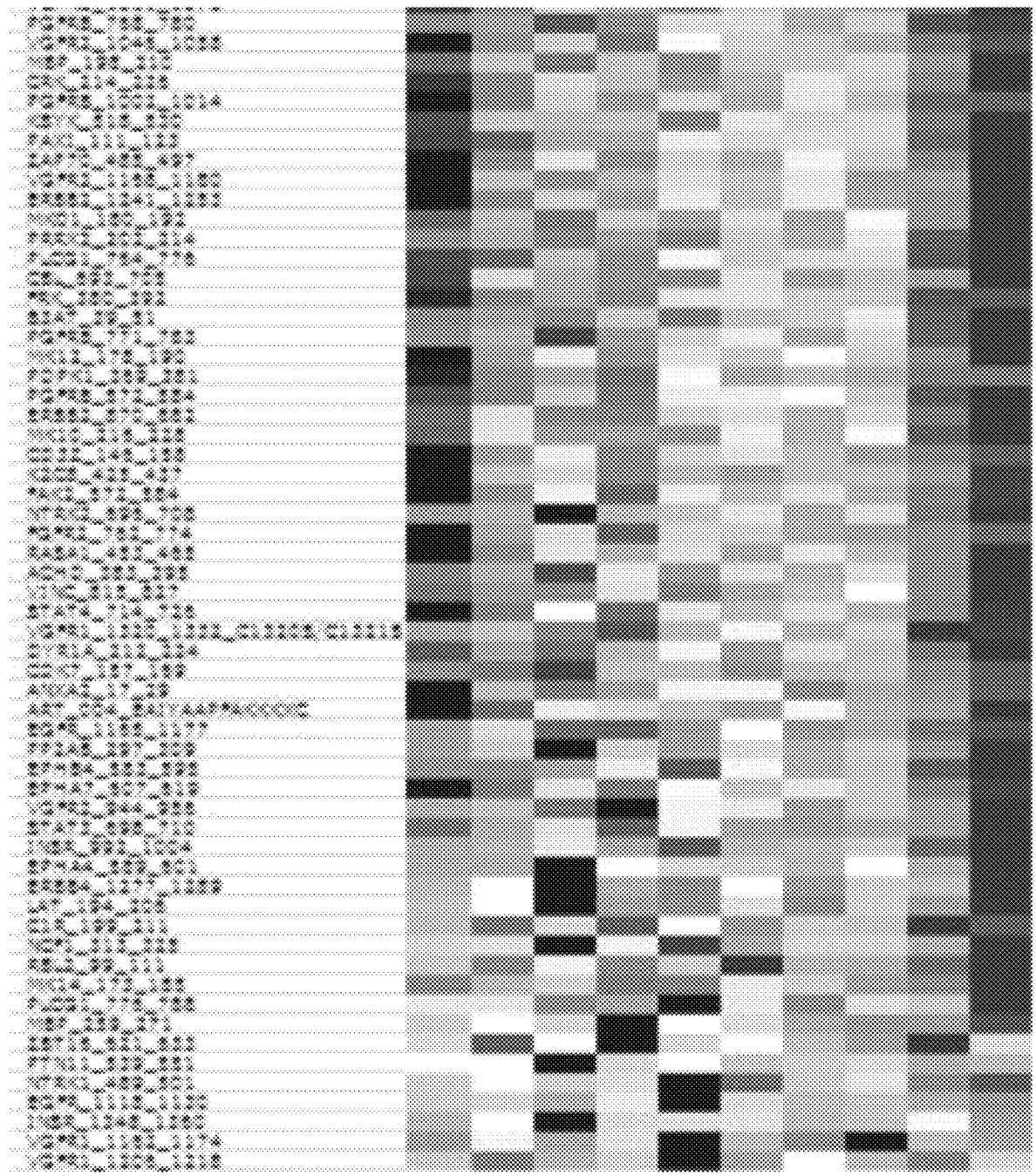

FIG. 3 shows the residual kinase activity on the peptides markers as listed in Table 1 and the correlation of the kinase activity profile to the treatment outcome of the patients to Ipilimumab. The tumor samples of the five melanoma patients who clinically responded to the Ipilimumab medicament treatment are indicated as "R" (LAM-18, -22, -23, -32 and -36) and the tumor samples of the five melanoma patients who clinically did not response to Ipilimumab medicament treatment are indicated as "NR" (LAM-05, -14, -26, -29 and -35). High kinase activities were found in responders, low in poor responders. The analysis was performed completely blinded.

Interestingly, both the phosphatase and kinase activity profile provided a good prediction of the treatment outcome of patients treated with Ipilimumab. Using the method according to the present invention it was possible to divide patients which are either responsive or non-responsive to a treatment with Ipilimumab. In particular SEQ ID NO 1 up to SEQ ID NO 10 as listed in Table 1 and SEQ ID NO 139 up to SEQ ID NO 148 as listed in Table 2 were identified as key biomarkers for the differentiation between responsive and non-responsive patients.

Example 2

Example Showing how Responders and Non-Responders to Targeted Pharmacotherapy can be Differentiated According to Kinase Inhibition Profiles A clinical study was conducted using PBMC (Peripheral Blood Mononuclear Cell) samples from melanoma patients treated with Pembrolizumab. The institute that provided the samples made an assessment of the clinical responses of the patients to the treatment. The patients with progressive disease (PD) were classified as Non-Responders (NR), those with stable disease (SD), partial response (PR) or complete response (CR) as Responders (R).

When peripheral whole blood is drawn for human immune system studies, it is often processed to remove red blood cells by density gradient centrifugation. Most commonly this method uses Ficoll Paque, a solution of high molecular weight sucrose polymers, a product of GE Healthcare Ltd. Ficoll separates whole blood into two fractions with densities above and below 1.077 g/ml. Peripheral blood mononuclear cells (PBMC) are the populations of cells that remain at the less dense, upper interface of the Ficoll layer, often referred to as the buffy coat and are the cells collected when the Ficoll fractionation method is used. PBMC consist of: 70-90% lymphocytes (T cells, B cells, and NK cells), 10-30% monocytes and 1-2% dendritic cells.

The samples were obtained by drawing blood in heparine tubes. After Ficoll fractionation PBMCs were frozen in 10%

DMSO/90% FBS according to standard procedures. The LDH value and composition of the blood was determined before or at the start of the therapy. All samples contained approximately ~1×10$^7$ PBMCs/vial.

After lysis and protein determination the PTP (Protein Tyrosine Phosphatase) and PTK (Protein Tyrosine Kinase) activity was determined for all samples using 2 ug of protein per array. Additionally the PTP assay was performed with 0.5 ug protein/array. The kinase and phosphatase activity profiling was performed on a PamStation96 or a PamStation12 instrument that runs 96 (or 12) peptide microarrays. Each condition was run in multiple replicates. Analysis was performed with basal PTP and PTK signals and VSN normalized signals.

Samples with low PTK activity (two 1st line Pembrolizumab responders) were excluded from the analysis. T-tests were performed to distinguish responders from non-responders on the basal signals and on the signals after VSN normalisation. Analysis of the normalised values for PTK showed differences between 1st line Pembrolizumab responders and non-responders. 7 peptides had lower signals in responders and 16 peptides had higher signals in responders ($p<0.05$).

Figure 4:
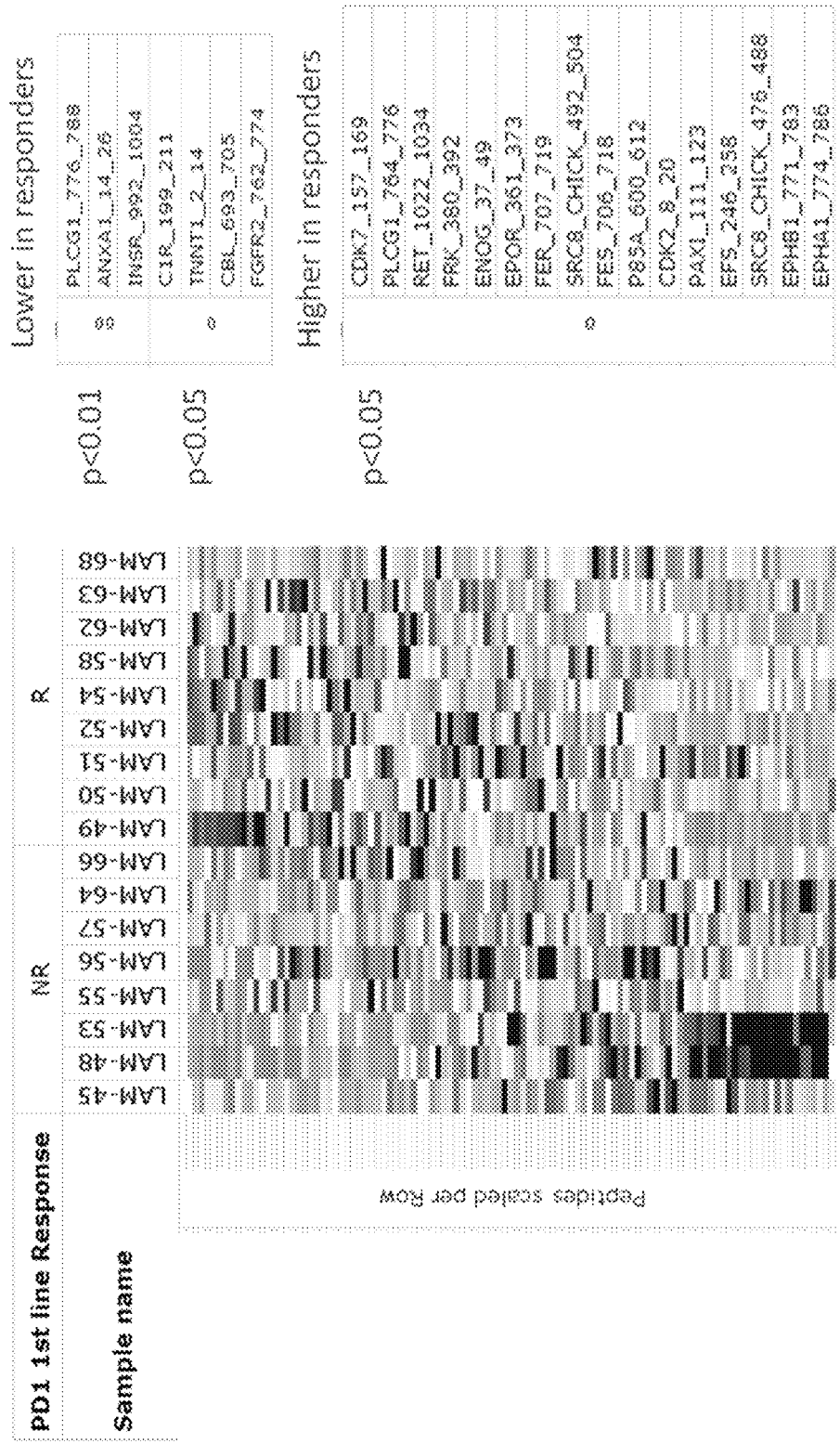
FIG. 4 shows a heatmap of z-score normalized peptides for 1st line Pembrolizumab responders vs non-responders. Peptides with significantly different (p<0.05) signals are shown on the right hand side. In particular SEQ ID NO 105, 17, 99, 94, 128, 24, 11, 1, 72, 16, 69, 187, 45, 22, 189, 48, 80, 55, 81, 124, 188, 49 and 60 as listed in Table 1 and Table 3, were identified as key biomarkers for the differentiation between responsive and non-responsive patients.

FIG. 4 shows a heatmap of z-score normalized peptides for 1st line Pembrolizumab responders vs non-responders. Peptides with significantly different ($p<0.05$) signals are shown on the right hand side. In particular SEQ ID NO 105, 17, 99, 94, 128, 24, 11, 1, 72, 16, 69, 187, 45, 22, 189, 48, 80, 55, 81, 124, 188, 49 and 60 as listed in Table 1 and Table 3, were identified as key biomarkers for the differentiation between responsive and non-responsive patients.

Figure 5:
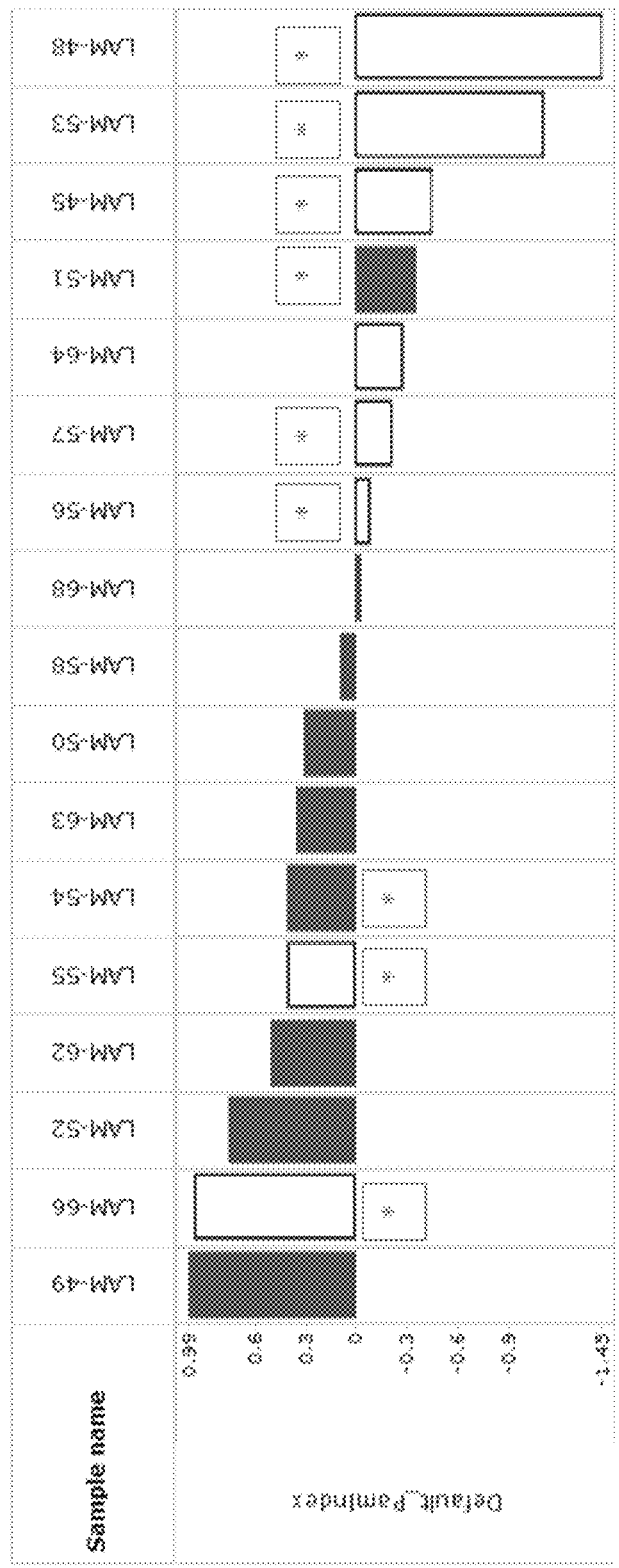
FIG. 5 shows results of a Partial Least Square Discriminant Analysis (PLS-DA) used to make a model for response prediction (Grey —Responders; White —Non-responders; * Metastasis present). The response for each sample was predicted with Leave One Out Cross Validation (LOOCV). For 13 out of 17 samples the prediction was correct (76%). The probability of obtaining such a result by chance is p<0.02. It should be noted that most non-responders to Pembrolizumab had brain metastases. LAM-54 also had a brain metastasis, but that was removed before treatment started. LAM-51, who was predicted incorrectly, stood out because the basophile count was 0.

Partial Least Square Discriminant Analysis (PLS-DA) was used to make a model for response prediction. The response for each sample was predicted with Leave One Out Cross Validation (LOOCV). The results of this analysis are shown in FIG. 5 (Grey—Responders; White—Non-responders; * Metastasis present). For 13 out of 17 samples the prediction was correct (76%). The probability of obtaining such a result by chance is $p<0.02$. It should be noted that most non-responders to Pembrolizumab had brain metastases. LAM-54 also had a brain metastasis, but that was removed before treatment started. LAM-51, who was predicted incorrectly, stood out because the basophile count was 0.

Interestingly, the kinase activity profile provided a good prediction of the treatment outcome of patients treated with Pembrolizumab. Using the method according to the present invention it was possible to divide patients which are either responsive or non-responsive to a treatment with Pembrolizumab. In SEQ ID NO 105, 17, 99, 94, 128, 24, 11, 1, 72, 16, 69, 187, 45, 22, 189, 48, 80, 55, 81, 124, 188, 49 and 60 as listed in Table 1 and Table 3 were identified as key biomarkers for the differentiation between responsive and non-responsive patients.

The invention claimed is:

1. A method of treating a patient diagnosed with melanoma cancer with a medicament selected from the group consisting of ipilimumab, nivolumab, pembrolizumab, pidilizumab, BMS-936559, atezolizumab, an analog thereof and combinations thereof, the method comprising (1) obtaining a prediction of the response of the patient diagnosed with melanoma cancer to the medicament, wherein the prediction was obtained by a method comprising the steps of:
   (a) measuring the phosphatase activity, the kinase activity, or the phosphatase activity and the kinase activity, of a sample, obtained from said patient diagnosed with melanoma, by contacting said sample with at least one protein phosphatase substrate, at least one protein kinase substrate, or at least one protein phosphatase substrate and at least one protein kinase substrate, thereby providing a phosphorylation profile of said sample, said phosphorylation profile comprising the phosphorylation levels of phosphorylation sites present (a.i) in at least 10 peptide markers selected from the group of peptide markers consisting of a peptide marker set forth in SEQ ID NO. 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170,171, 172, 173, 174, 175, 176, 177, 178, 179, 180, 181, 182, 183, 184, 185 and 186, (a.ii) in at least 10 peptide markers selected from the group of peptide markers consisting of a peptide marker set forth in SEQ ID NO. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, and 138 and/or selected from the group of peptide markers consisting of a peptide marker set forth in SEQ ID NO. 187, 188 and 189, or (a.iii) in at least 10 peptide markers selected from the group of peptide markers consisting of a peptide marker set forth in SEQ ID NO. 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170,171, 172, 173, 174, 175, 176, 177, 178, 179, 180, 181, 182, 183, 184, 185 and 186 and in at least 10 peptide markers selected from the group of peptide markers consisting of a peptide marker set forth in SEQ ID NO. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, and 138 and/or selected from the group of peptide markers consisting of a peptide marker set forth in SEQ ID NO. 187, 188 and 189;
   wherein said sample is obtained from a blood sample of said patient diagnosed with melanoma; and
   (b) determining from said phosphorylation profile the response of said patient to said medicament;
   wherein the response of said patient to said medicament is determined from said phosphorylation profile by
      (i) comparing said phosphorylation profile to a first reference phosphorylation profile, a second reference phosphorylation profile, or a combination thereof; said first reference phosphorylation profile being representative for a good responder to said medicament and said second reference phosphorylation profile being representative for a poor responder to said medicament; and
      (ii) determining the response of said patient to said medicament on the basis of the comparison of said phosphorylation profile with said first reference phosphorylation profile, said second reference phosphorylation profile, or a combination thereof;
   wherein said medicament is selected from the group consisting of ipilimumab, nivolumab, pembrolizumab, pidilizumab, BMS-936559, atezolizumab, an analog thereof and combinations thereof; and
(2) treating said patient with the medicament providing the best response in step (1) (b).

2. The method of claim 1, wherein said blood sample comprises peripheral blood mononuclear cells.

3. The method of claim 1, wherein said phosphorylation profiles comprise the phosphorylation levels of phosphorylation sites present (a.i) in at least 30 of the peptide markers selected from the group of peptide markers consisting of a peptide marker set forth in SEQ ID NO. 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170,171, 172, 173, 174, 175, 176, 177, 178, 179, 180, 181, 182, 183, 184, 185 and 186, (a.ii) in at least 30 peptide markers selected from the group of peptide markers consisting of a peptide marker set forth in SEQ ID NO. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, and 138 and/or selected from the group of peptide markers consisting of a peptide marker set forth in SEQ ID NO. 187, 188 and 189, or (a.iii) in at least 30 of the peptide markers selected from the group of peptide markers consisting of a peptide marker set forth in SEQ ID NO. 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170,171, 172, 173, 174, 175, 176, 177, 178, 179, 180, 181, 182, 183, 184, 185 and 186 and at least 30 of the peptide markers selected from the group of peptide markers consisting of a peptide marker set forth in SEQ ID NO. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, and 138 and/or selected from the group of peptide markers consisting of a peptide marker set forth in SEQ ID NO. 187, 188 and 189.

4. The method according to claim 1, wherein said phosphorylation profiles comprise the phosphorylation levels of phosphorylation sites present (a.i) in the peptide markers set forth in SEQ ID NO. 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170,171, 172, 173, 174, 175, 176, 177, 178, 179, 180, 181, 182, 183, 184, 185 and 186, (a.ii) in the peptide markers set forth in SEQ ID NO. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, and 138, and/or peptide markers set forth in SEQ ID NO. 187, 188 and 189 or (a.iii) in the peptide markers set forth in SEQ ID NO. 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170,171, 172, 173, 174, 175, 176, 177, 178, 179, 180, 181, 182, 183, 184, 185 and 186 and the peptide markers set forth in SEQ ID NO. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, and 138 and/or peptide markers set forth in SEQ ID NO. 187, 188 and 189.

5. The method according to claim 1, wherein said phosphorylation profile indicates good response, poor response or undetermined response of said patient to said medicament.

6. The method according to claim 1, wherein said melanoma is an irresectable stage IIIc or IV melanoma.

7. The method according to claim 1, wherein from the measurements in step (a) the toxicity of said medicament in said patient is determined.

8. The method according to claim 1, wherein said phosphorylation profile comprises the phosphorylation levels of phosphorylation sites present in SEQ ID NO 1 up to SEQ ID NO 10.

9. The method according to claim 1, wherein said phosphorylation profile comprises the phosphorylation levels of phosphorylation sites present in SEQ ID NO 105, 17, 99, 94, 128, 24, 11, 1, 72, 16, 69, 187, 45, 22, 189, 48, 80, 55, 81, 124, 188, 49 and 60.

* * * * *